(12) United States Patent
Rodriguez Herrera et al.

(10) Patent No.: US 10,920,552 B2
(45) Date of Patent: Feb. 16, 2021

(54) METHOD OF INTEGRATING FRACTURE, PRODUCTION, AND RESERVOIR OPERATIONS INTO GEOMECHANICAL OPERATIONS OF A WELLSITE

(71) Applicant: SCHLUMBERGER TECHNOLOGY CORPORATION, Sugar Land, TX (US)

(72) Inventors: Adrian Rodriguez Herrera, London (GB); Piyush Pankaj, Sugar Land, TX (US); Hitoshi Onda, Houston, TX (US); Sumant Kamat, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 269 days.

(21) Appl. No.: 15/757,225

(22) PCT Filed: Sep. 5, 2016

(86) PCT No.: PCT/US2016/050328
§ 371 (c)(1),
(2) Date: Mar. 2, 2018

(87) PCT Pub. No.: WO2017/041074
PCT Pub. Date: Mar. 9, 2017

(65) Prior Publication Data
US 2018/0355707 A1    Dec. 13, 2018

Related U.S. Application Data

(60) Provisional application No. 62/214,012, filed on Sep. 3, 2015.

(51) Int. Cl.
*G06G 7/48* (2006.01)
*E21B 43/26* (2006.01)
(Continued)

(52) U.S. Cl.
CPC .............. *E21B 43/26* (2013.01); *G01V 1/288* (2013.01); *G01V 1/42* (2013.01); *G01V 1/50* (2013.01);
(Continued)

(58) Field of Classification Search
CPC .... E21B 43/26; E21B 43/267; E21B 41/0092; E21B 49/00; G01V 1/288; G01B 99/005
(Continued)

(56) References Cited

U.S. PATENT DOCUMENTS 6,101,447 A   8/2000  Poe, Jr.
7,363,162 B2  4/2008  Thambynayagam et al.
(Continued)

FOREIGN PATENT DOCUMENTS

WO    2013016733 A1    1/2013
WO    2013055930 A1    4/2013
(Continued)

OTHER PUBLICATIONS

International Search Report and Written Opinion issued in International Patent Appl. No. PCT/US2016/050328 dated Nov. 28, 2016; 11 pages.
(Continued)

*Primary Examiner* — Andre Pierre Louis
(74) *Attorney, Agent, or Firm* — Rodney Warfford

(57) ABSTRACT

A method of performing oilfield operations at a wellsite is disclosed. The wellsite is positioned about a subterranean formation having a wellbore therethrough and a fracture network therein. The fracture network includes natural fractures. The method involves generating fracture parameters including a hydraulic fracture network based on wellsite data including a mechanical earth model, generating reservoir parameters including a reservoir grid based on the wellsite data and the generated fracture wellsite parameters,
(Continued)

generating production parameters comprising production rate over time based on the wellsite data and the hydraulic fracture network, forming a finite element grid from the fracture parameters, the production parameters, and the reservoir parameters by coupling the hydraulic fracture network to the reservoir grid, generating integrated geomechanical parameters including estimated microseismic events based on the finite element grid, and performing fracture operations and production operations based on the integrated geomechanical parameters.

21 Claims, 19 Drawing Sheets

(51) Int. Cl.
    *G01V 1/28*     (2006.01)
    *G01V 1/42*     (2006.01)
    *G01V 1/50*     (2006.01)
    *G01V 99/00*     (2009.01)
    *G01V 1/30*     (2006.01)

(52) U.S. Cl.
    CPC ............ *G01V 99/005* (2013.01); *G01V 1/306* (2013.01); *G01V 2210/624* (2013.01); *G01V 2210/646* (2013.01)

(58) Field of Classification Search
    USPC ........................................................ 703/9, 10
    See application file for complete search history.

(56) References Cited

U.S. PATENT DOCUMENTS

| | | |
|---|---|---|
| 7,509,245 B2 | 3/2009 | Siebrits et al. |
| 7,784,544 B2 | 8/2010 | Lindvig et al. |
| 7,788,074 B2 | 8/2010 | Scheidt et al. |
| 8,271,243 B2 | 9/2012 | Koutsabeloulis et al. |
| 8,280,709 B2 | 10/2012 | Koutsabeloulis et al. |
| 8,412,500 B2 | 4/2013 | Weng et al. |
| 8,428,923 B2 | 4/2013 | Siebrits et al. |
| 8,571,843 B2 | 10/2013 | Weng et al. |
| 8,762,118 B2 | 6/2014 | Nasreldin et al. |
| 9,068,448 B2 | 6/2015 | Hui et al. |
| 9,228,425 B2 | 1/2016 | Ganguly et al. |
| 9,715,026 B2 | 7/2017 | Ejofodomi et al. |
| 2002/0043370 A1 | 4/2002 | Poe |
| 2008/0133186 A1 | 6/2008 | Li et al. |
| 2008/0183451 A1 | 7/2008 | Weng et al. |
| 2010/0088076 A1 | 4/2010 | Koutsabeloulis et al. |
| 2010/0138196 A1* | 6/2010 | Hui ...................... E21B 43/00 703/1 |
| 2010/0250215 A1 | 9/2010 | Kennon et al. |
| 2011/0029291 A1 | 2/2011 | Weng et al. |
| 2013/0144532 A1 | 6/2013 | Williams et al. |
| 2013/0215712 A1* | 8/2013 | Geiser ................... G01V 1/288 367/9 |
| 2014/0052377 A1 | 2/2014 | Downie |
| 2014/0151035 A1* | 6/2014 | Cohen .................... E21B 43/26 166/250.15 |
| 2014/0299315 A1 | 10/2014 | Chuprakov et al. |
| 2014/0305638 A1 | 10/2014 | Kresse et al. |
| 2014/0372089 A1 | 12/2014 | Weng et al. |
| 2015/0204174 A1 | 7/2015 | Kresse et al. |
| 2016/0357883 A1 | 12/2016 | Weng et al. |

FOREIGN PATENT DOCUMENTS

| | | |
|---|---|---|
| WO | 2013067363 A1 | 5/2013 |
| WO | 2014105659 A1 | 7/2014 |
| WO | 2014200510 A1 | 12/2014 |
| WO | 2015003028 A1 | 1/2015 |
| WO | 2015069817 A1 | 5/2015 |

OTHER PUBLICATIONS

Gu et al., "Hydraulic Fracture Crossing Natural Fracture at Non-Orthogonal Angles, A Criterion, Its Validation and applications", SPE 139984, SPE Hydraulic Fracturing Conference and Exhibition, Jan. 24-26, 2011, 11 pages.

Kresse et al., "Numerical Modeling of Hydraulic Fracutring in Naturally Fractured Formations", 45th US Rock Mechanics/ Geomechanics Symposium, San Francisco, CA, Jun. 26-29, 2011, 11 pages.

\* cited by examiner

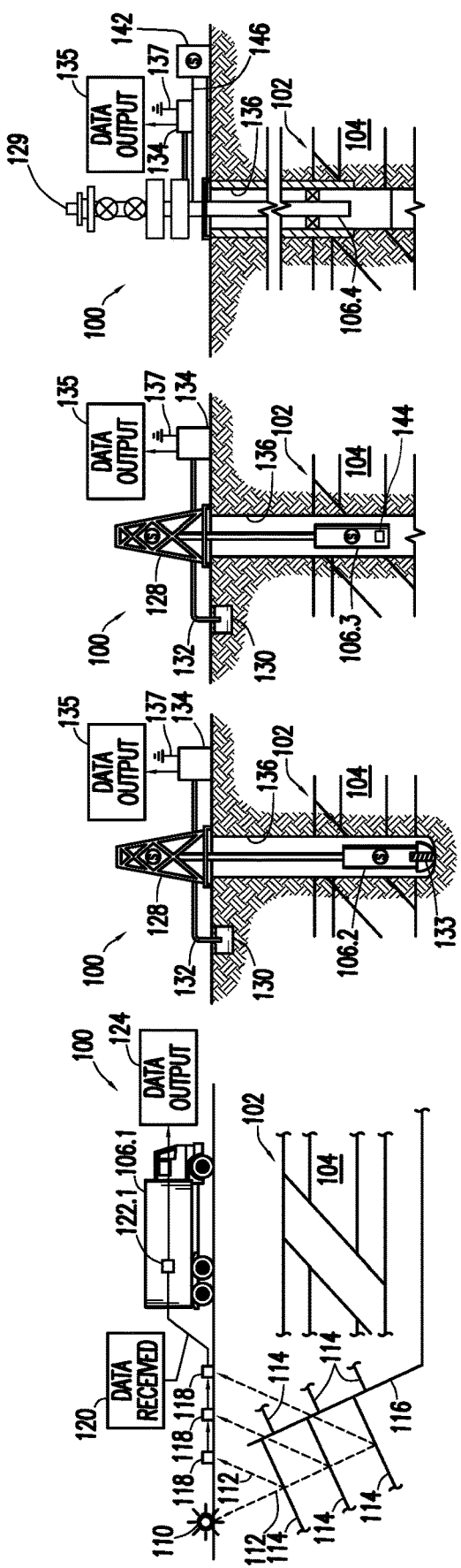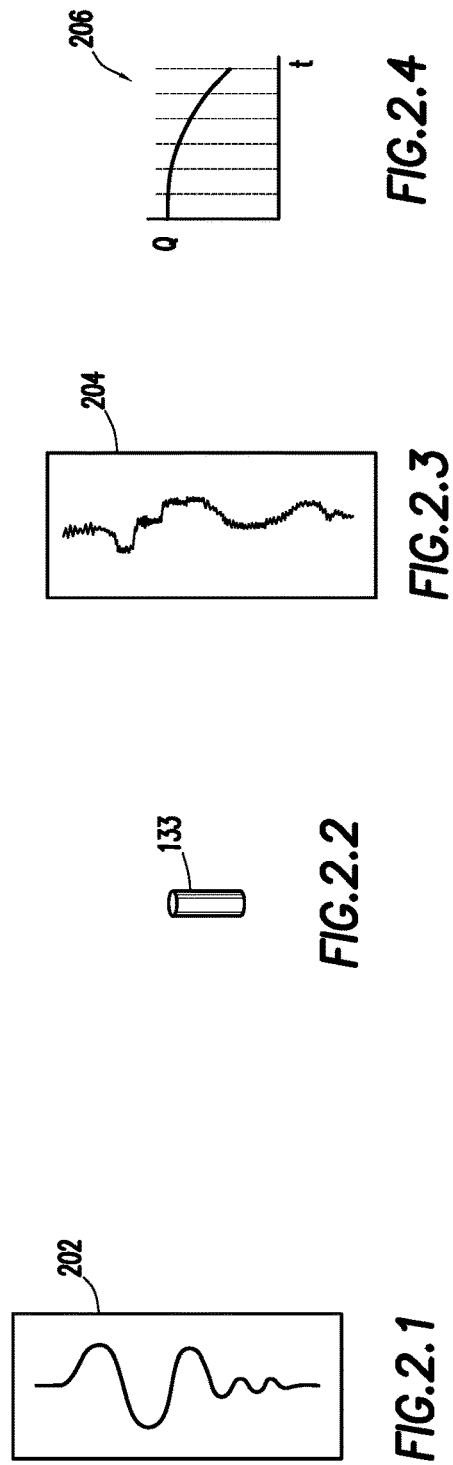

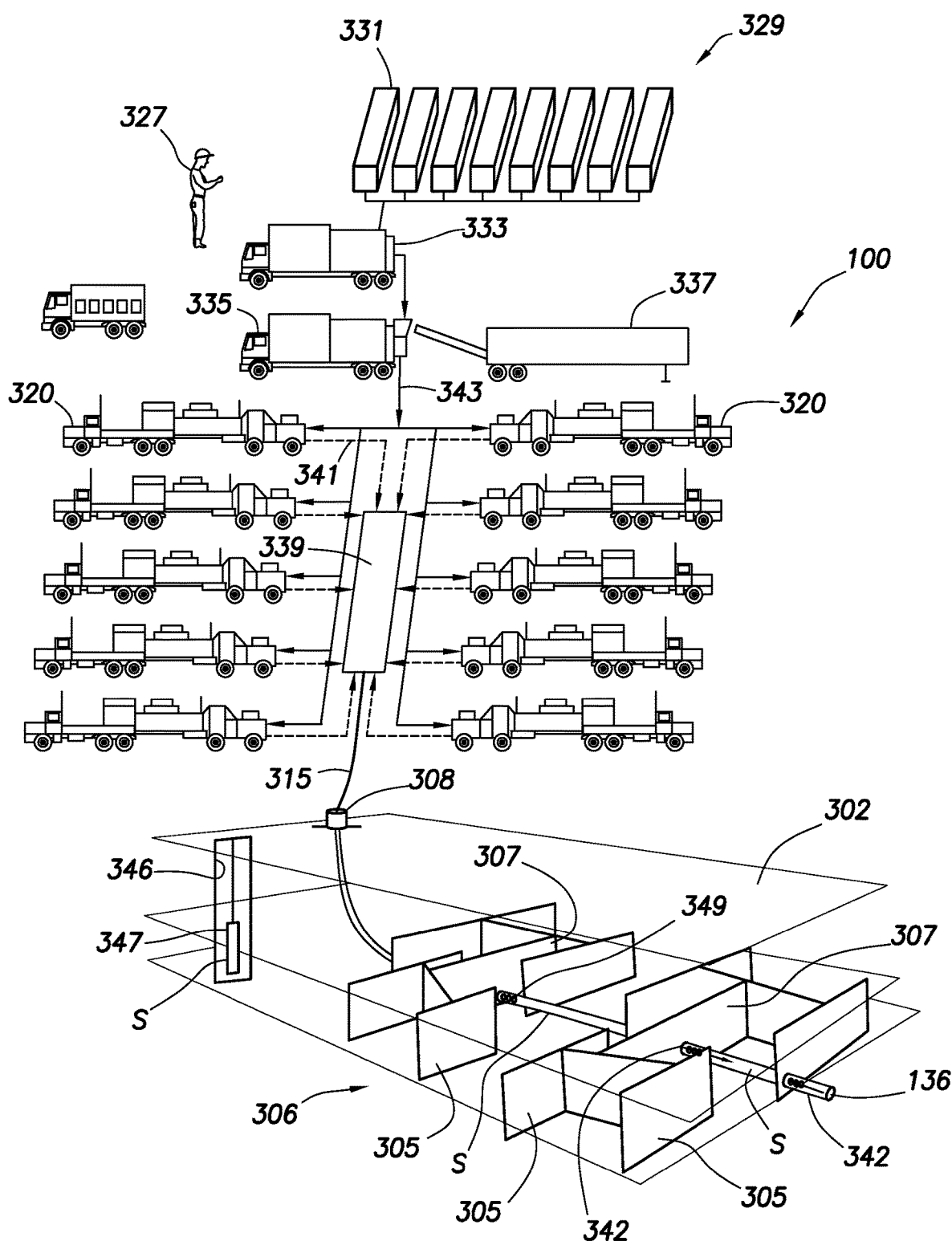
FIG.3.1

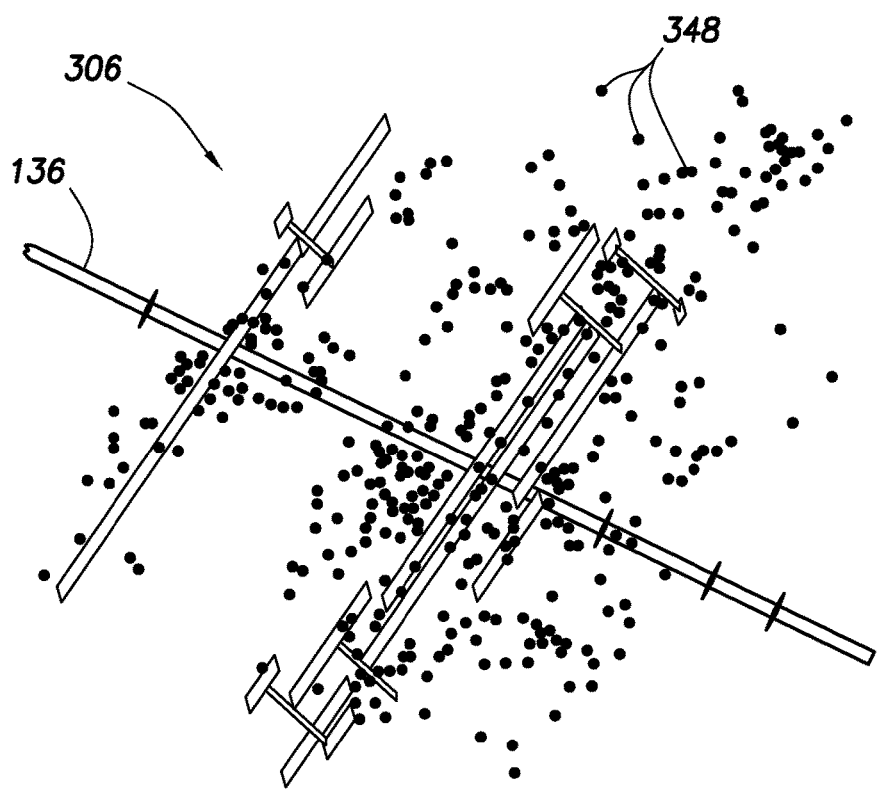
FIG.3.2
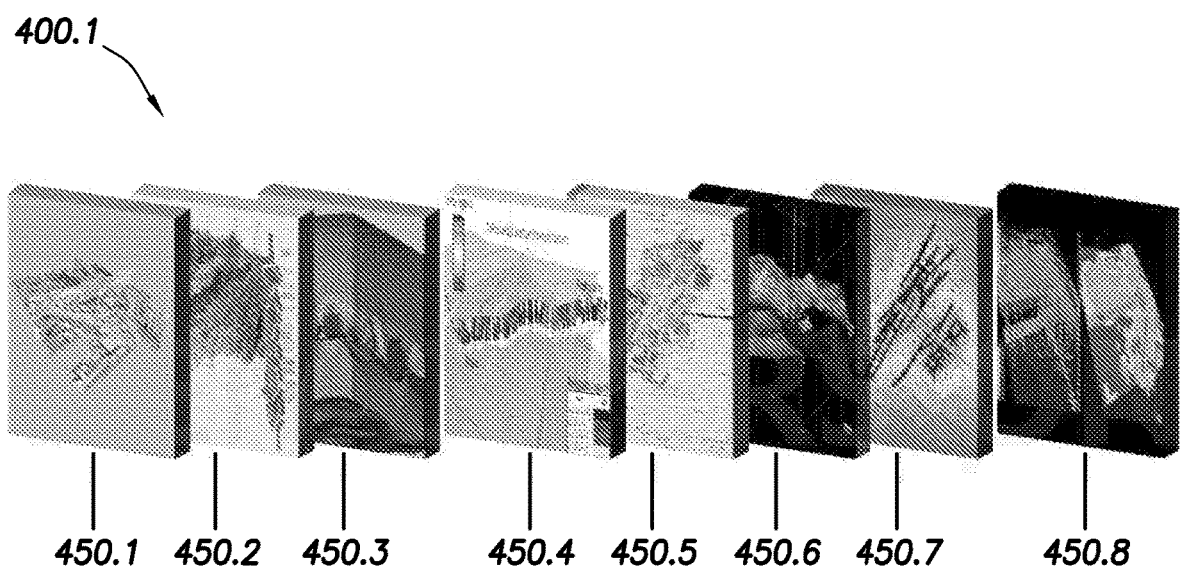
FIG.4.1

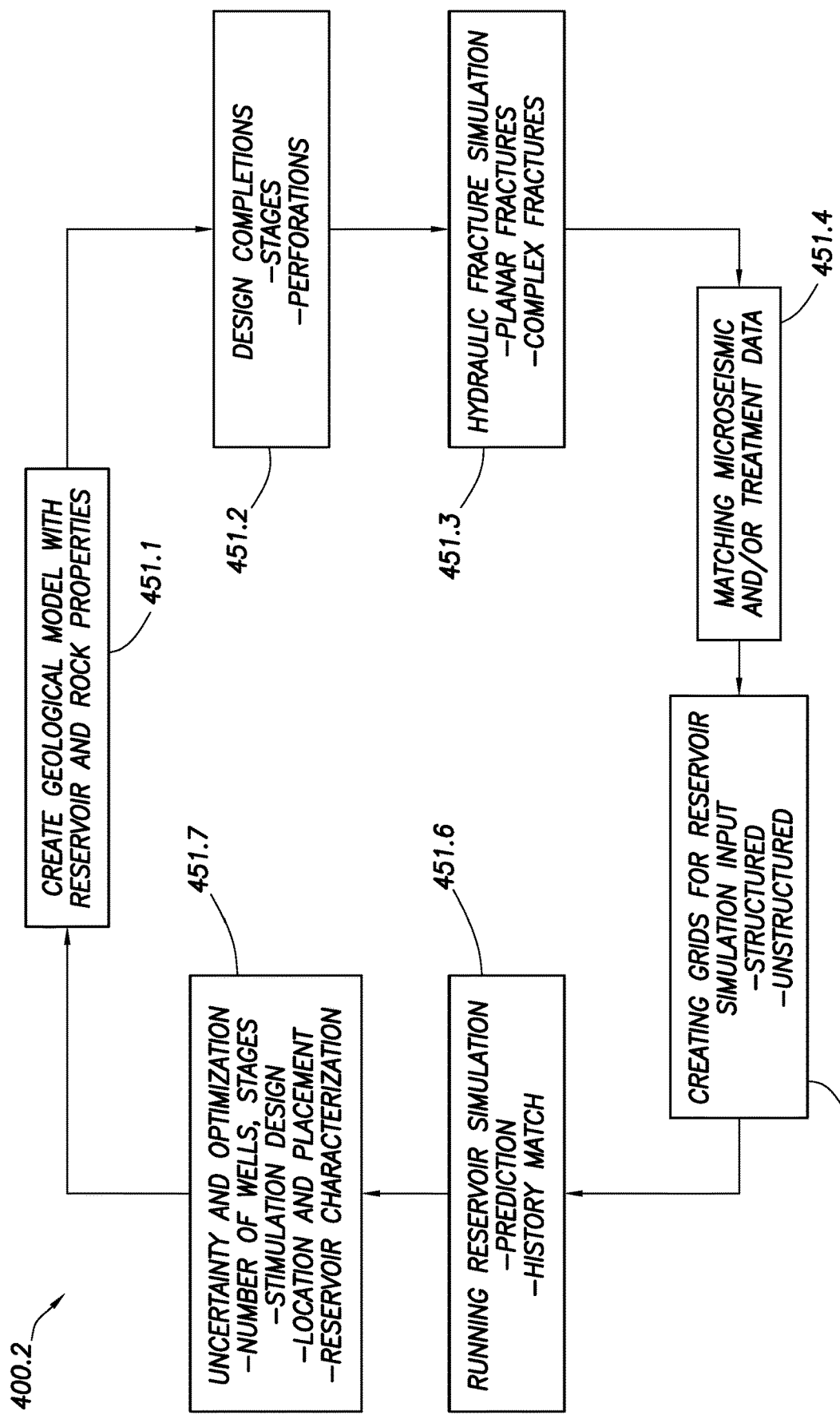
FIG.4.2

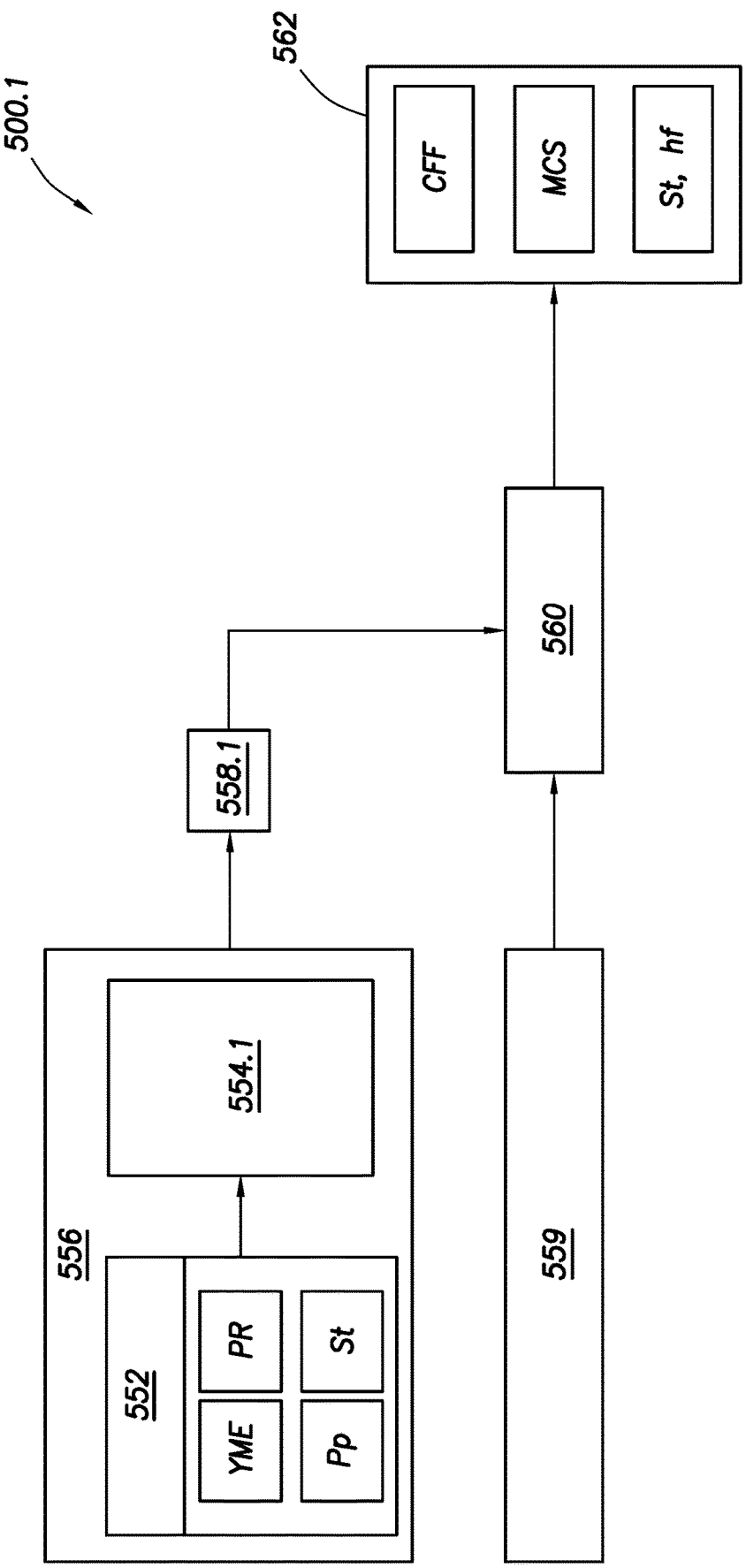
FIG.5.1

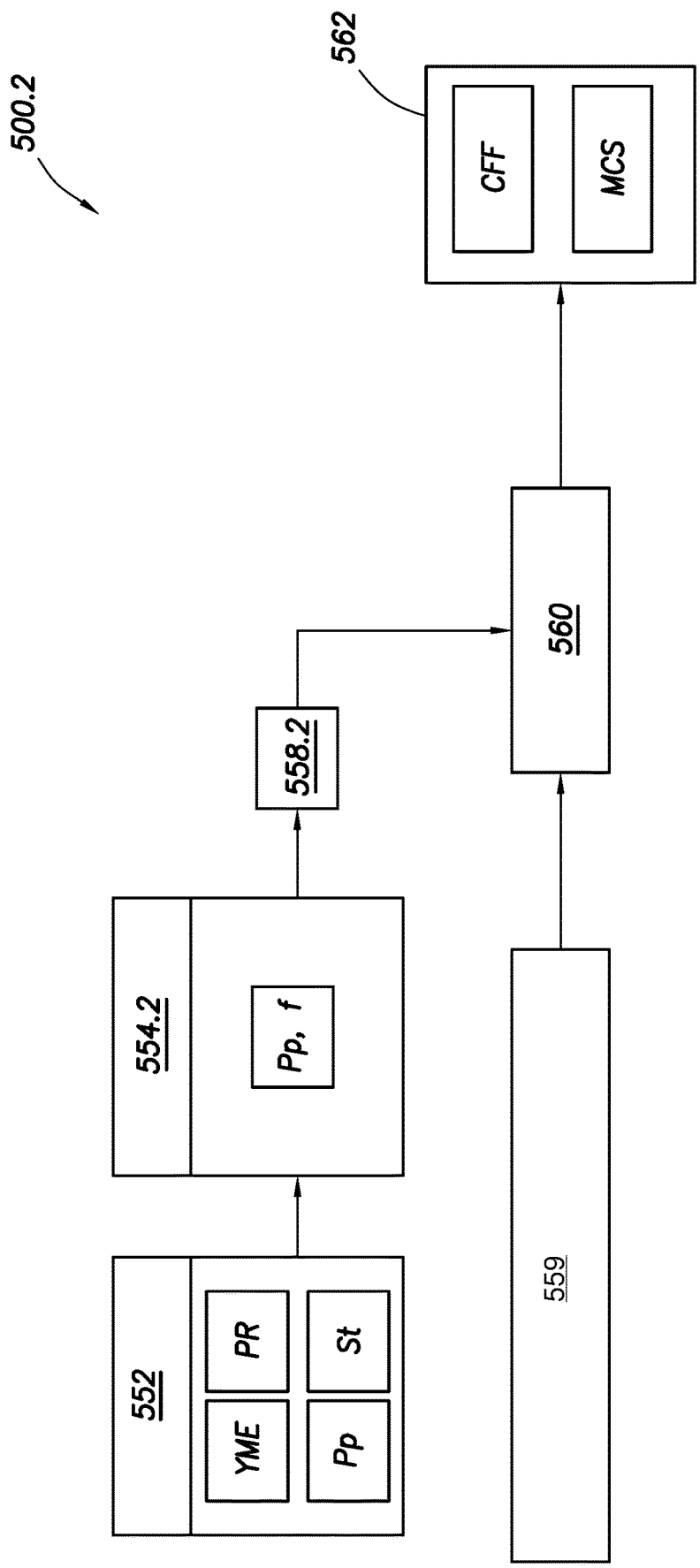
FIG.5.2

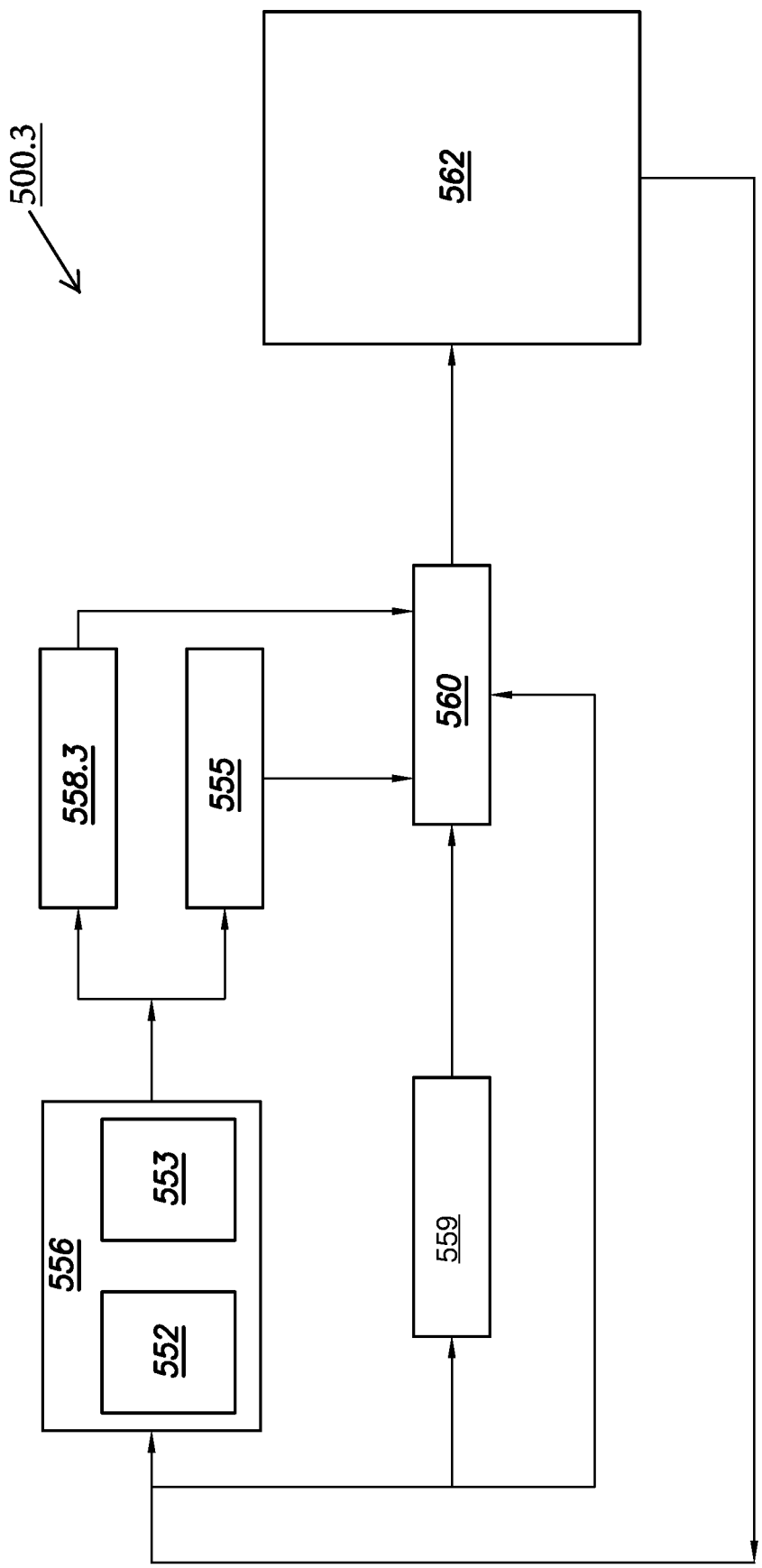
FIG.5.3

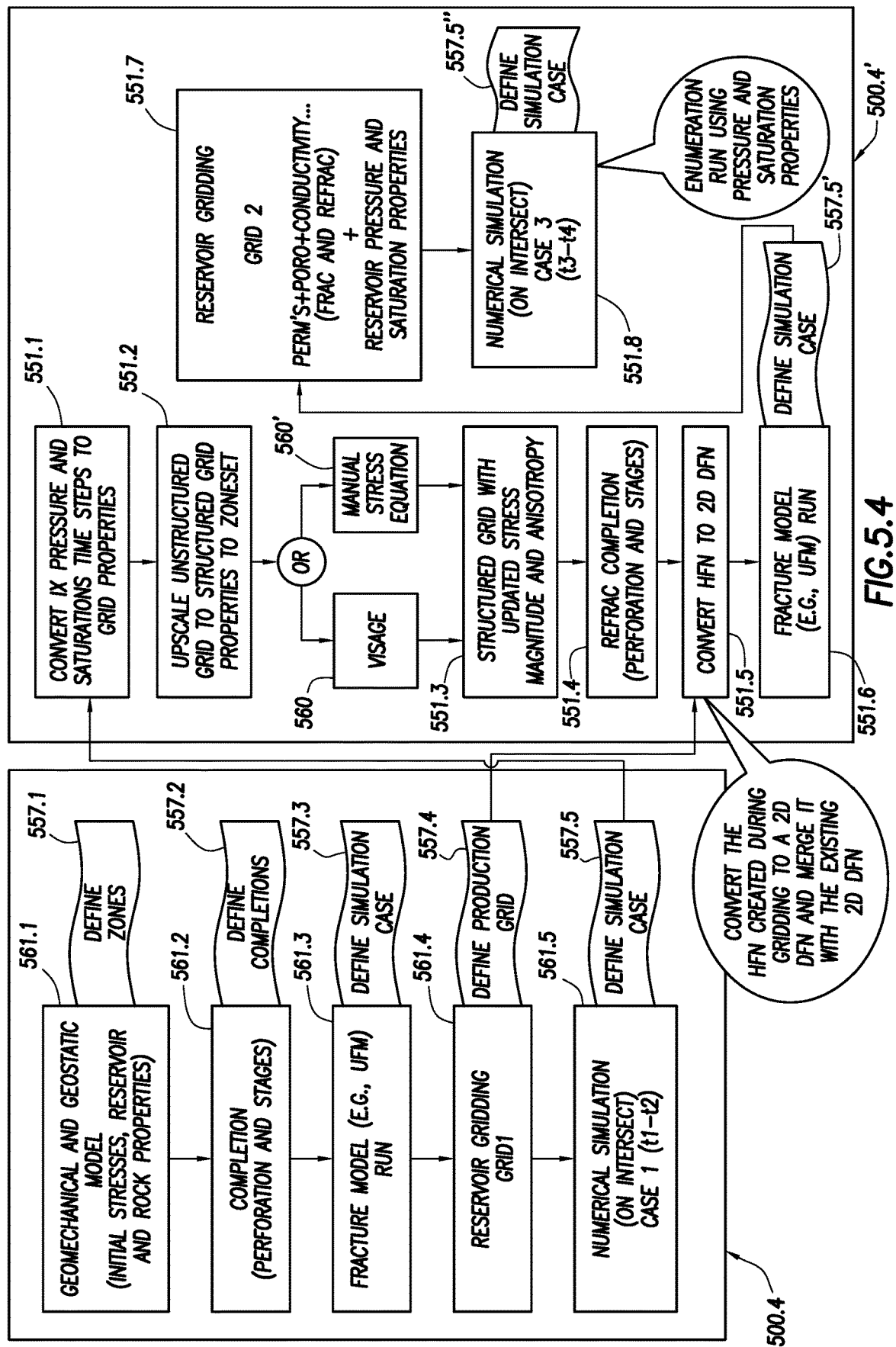
FIG.5.4

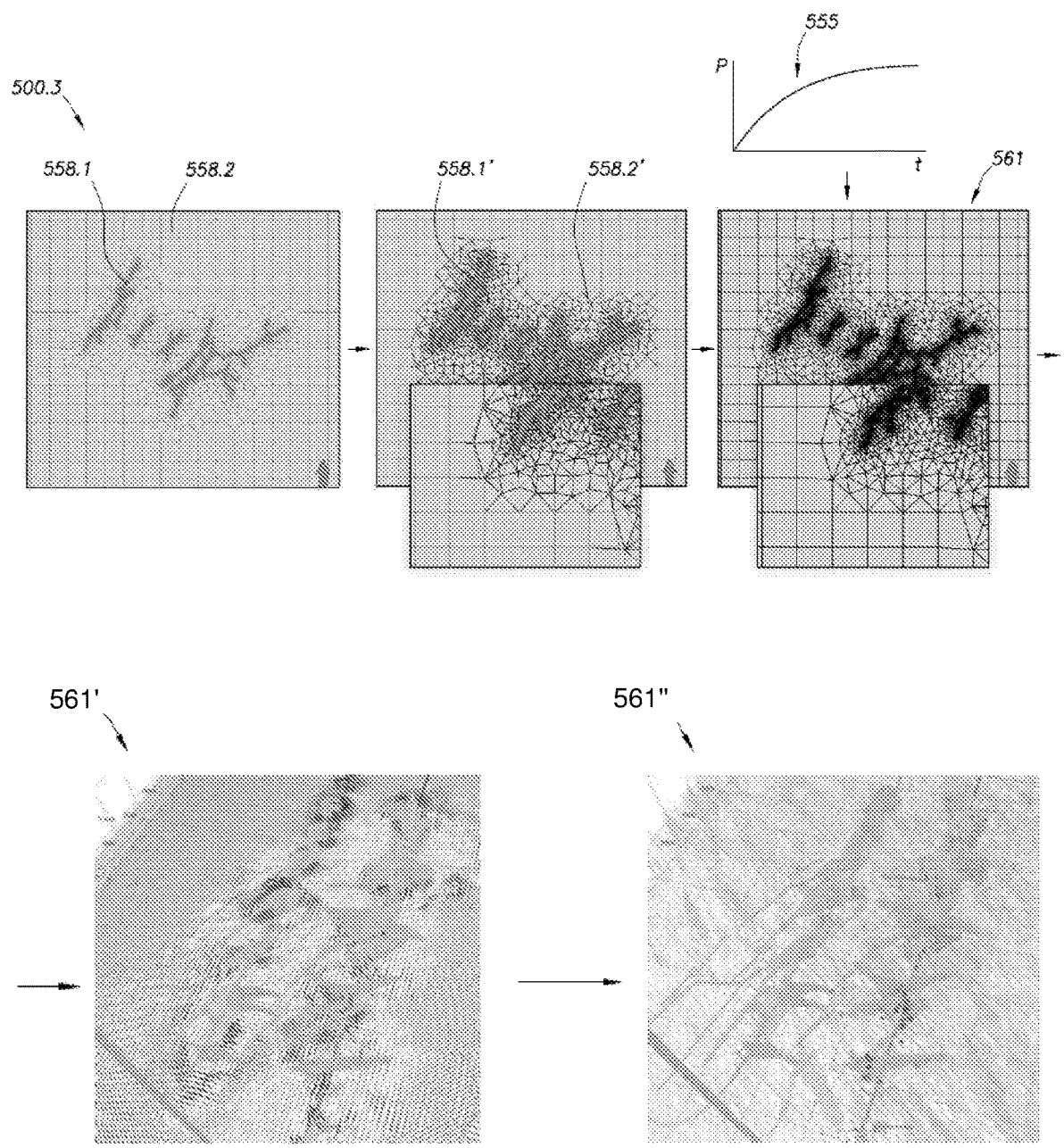
FIG.5.5

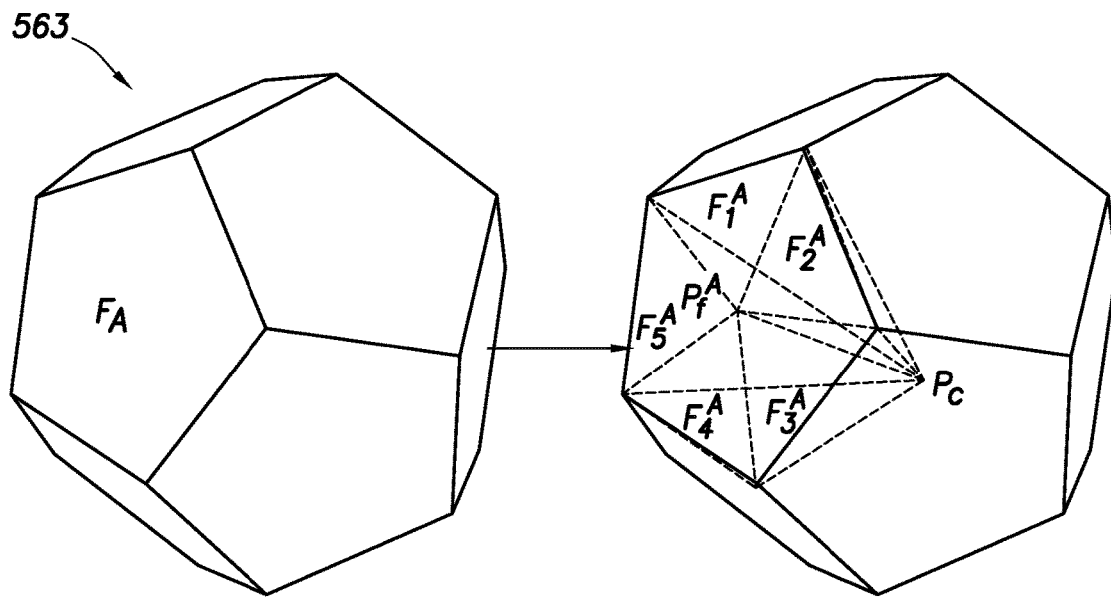
FIG.5.6
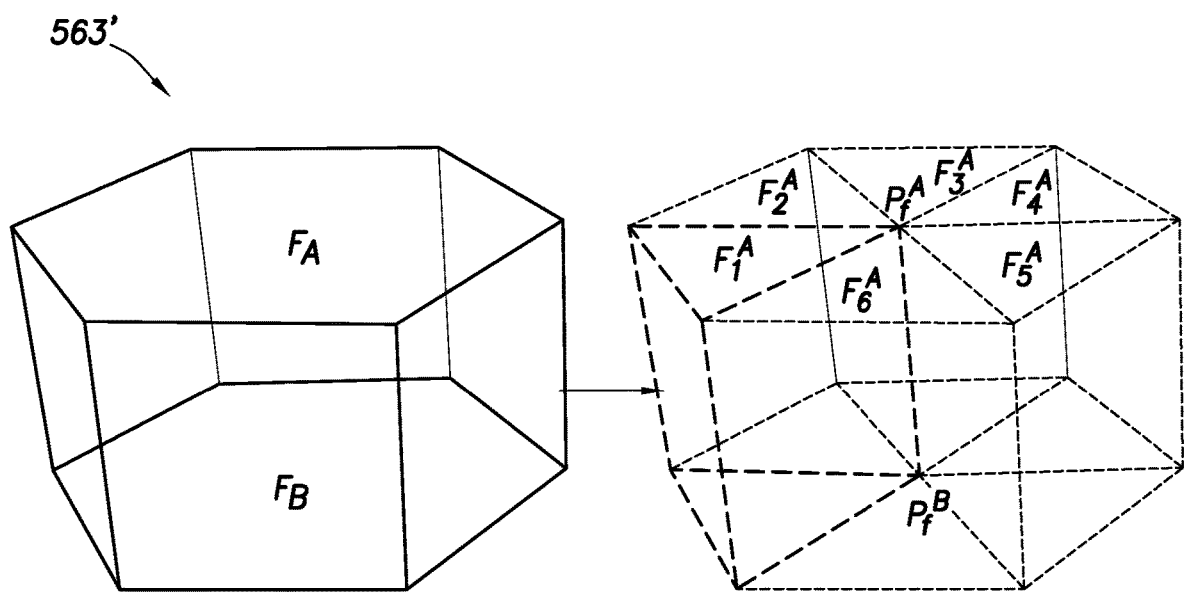
FIG.5.7

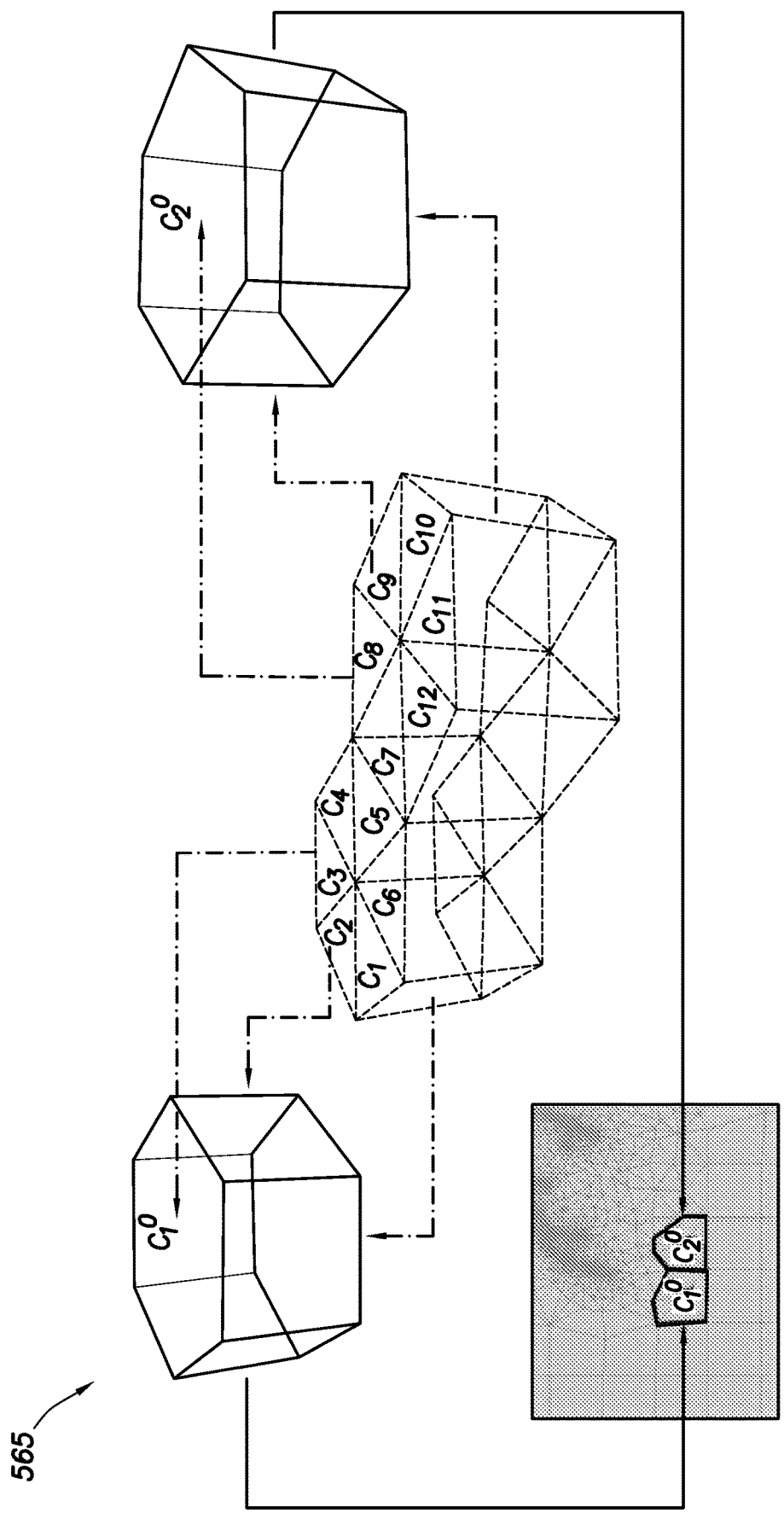
FIG.5.8

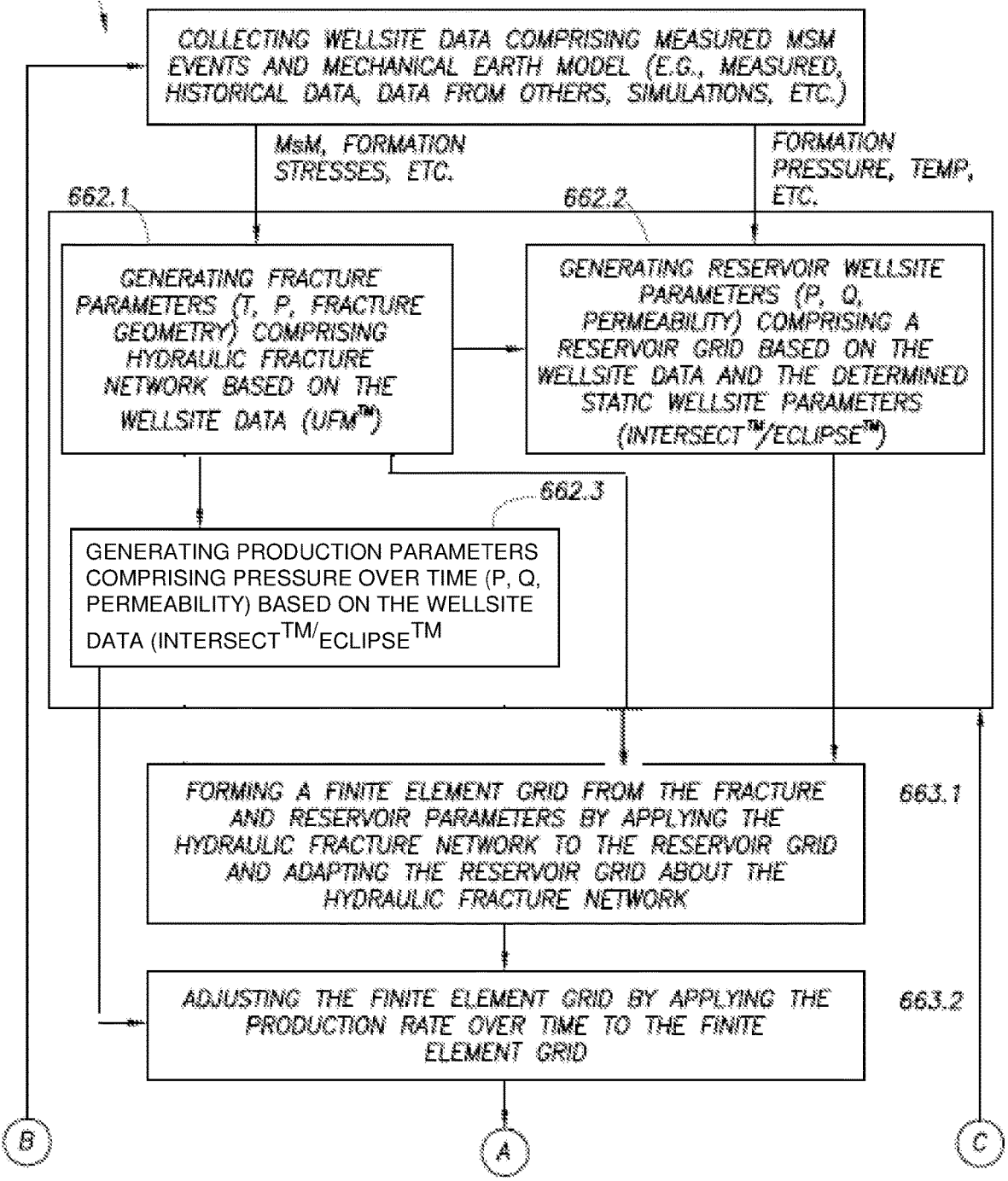
FIG.6.1

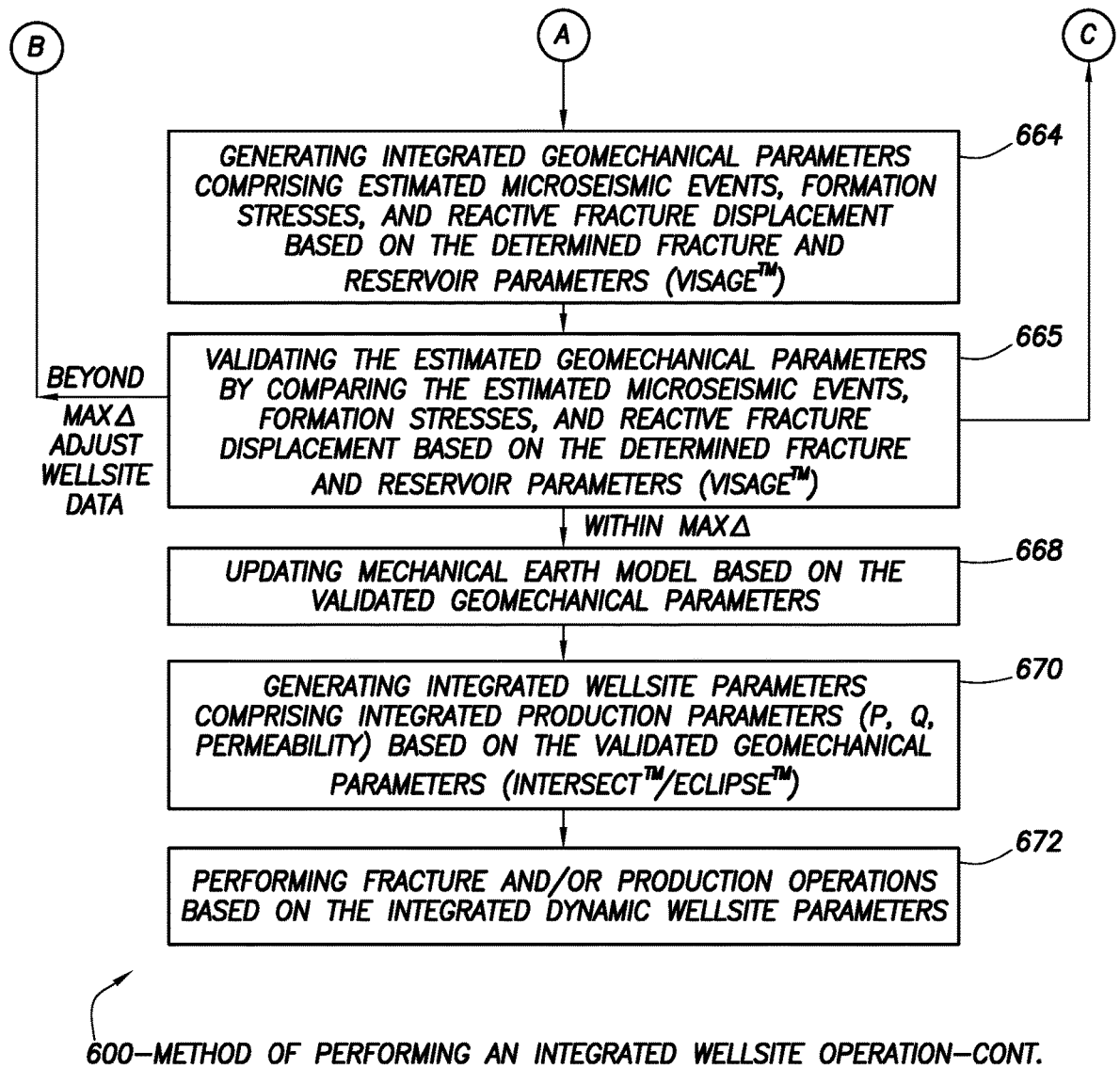
FIG.6.2

METHOD OF INTEGRATING FRACTURE, PRODUCTION, AND RESERVOIR OPERATIONS INTO GEOMECHANICAL OPERATIONS OF A WELLSITE

CROSS-REFERENCE TO RELATED APPLICATIONS

The application claims the benefit of U.S. Provisional Application No. 62/214,012, filed on Sep. 3, 2015, the entire contents of which are hereby incorporated by reference herein.

BACKGROUND

The present disclosure relates generally to methods and systems for performing wellsite operations. More particularly, this disclosure is directed to methods and systems for performing fracture (or stimulation) operations and/or production operations at a wellsite.

In order to facilitate the recovery of hydrocarbons from oil and gas wells, the subterranean formations surrounding such wells can be stimulated using hydraulic fracturing. Hydraulic fracturing may be used to create cracks in subsurface formations to allow oil or gas to move toward the well. A formation may be fractured, for example, by introducing a specially engineered fluid (referred to as "injection fluid", "fracturing fluid", or "slurry" herein) at high pressure and high flow rates into the formation through one or more wellbores.

Patterns of hydraulic fractures created by the fracturing stimulation may be complex and may form a complex fracture network. Hydraulic fractures may extend away from the wellbore in various directions according to the natural stresses within the formation. Fracture networks may be measured by monitoring seismic signals of the earth to detect subsurface event locations.

Fracture networks may also be predicted using models. Examples of fracture models are provided in U.S. Pat. Nos. 6,101,447, 7,363,162, 7,509,245, 7,788,074, 8,428,923, 8,412,500, 8,571,843, 20080133186, 20100138196, and 20100250215, and PCT Application Nos. WO2013/067363, PCT/US2012/48871 and US2008/0183451, and PCT/US2012/059774, the entire contents of which are hereby incorporated by reference herein.

Despite the advances in fracturing techniques, there remains a need to provide a more meaningful understanding of fracture parameters in order to properly predict and/or design fracture operations to generate desired production at the wellsite. The present disclosure is directed at meeting such need.

SUMMARY

In at least one aspect, the present disclosure relates to a method of performing oilfield operations at a wellsite. The wellsite is positioned about a subterranean formation having a wellbore therethrough and a fracture network therein. The fracture network includes natural fractures. The method involves generating fracture parameters comprising a hydraulic fracture network based on wellsite data comprising a mechanical earth model (MEM), generating reservoir parameters comprising a reservoir grid based on the wellsite data and the generated fracture wellsite parameters, generating production parameters comprising production rate over time based on the wellsite data and the hydraulic fracture network, forming a finite element grid from the fracture parameters, the production parameters, and the reservoir parameters by coupling the hydraulic fracture network to the reservoir grid, generating integrated geomechanical parameters comprising estimated microseismic events based on the finite element grid, and performing fracture operations and production operations based on the integrated geomechanical parameters.

In another aspect, the present disclosure relates to a method of performing oilfield operations at a wellsite. The wellsite is positioned about a subterranean formation having a wellbore therethrough and a fracture network therein. The fracture network includes natural fractures. The method involves collecting wellsite data comprising microseismic events and a MEM, generating fracture parameters comprising a hydraulic fracture network based on the wellsite data, generating reservoir parameters comprising a reservoir grid based on the wellsite data and the generated fracture parameters, generating production parameters comprising production rate over time based on the wellsite data and the hydraulic fracture network, forming a finite element grid from the fracture parameters, the production parameters, and the reservoir parameters by coupling the hydraulic fracture network to the reservoir grid, generating integrated geomechanical parameters comprising estimated microseismic events based on the finite element grid, generating integrated wellsite parameters comprising integrated production parameters based on the integrated geomechanical parameters, and performing fracture operations and production operations based on the integrated wellsite parameters.

In yet another aspect, the present disclosure relates to a method of performing oilfield operations at a wellsite. The wellsite is positioned about a subterranean formation having a wellbore therethrough and a fracture network therein. The fracture network comprising natural fractures. The method involves collecting wellsite data comprising microseismic events and an MEM, generating fracture parameters comprising a hydraulic fracture network based on the wellsite data, generating reservoir parameters comprising a reservoir grid based on the wellsite data and the determined generated fracture parameters, generating production parameters comprising production rate over time based on the wellsite data and the hydraulic fracture network, forming a finite element grid from the fracture parameters, the production parameters, and the reservoir parameters by coupling the hydraulic fracture network to the reservoir grid, generating integrated geomechanical parameters comprising estimated microseismic events based on the finite element grid, validating the integrated geomechanical parameters by comparing the estimated microseismic events with the measured microseismic events, updating the based on the validated geomechanical parameters, generating integrated wellsite parameters comprising integrated production parameters based on the validated, integrated geomechanical parameters, and performing fracture operations and production operations based on the integrated wellsite parameters.

Finally, in another aspect, the present disclosure relates to a method and system for predicting induced microseismicity due to hydraulic fracture stimulation comprising coupling a finite element geomechanic simulator with MANGROVE™ workflows and/or a reservoir simulator to generate microseismic events and/or to predict critically stressed and non-critically stressed planes of a natural fracture network due to stress change.

Embodiments herein relate to a method and system comprising of coupling a finite element geomechanic reservoir simulator and a reservoir simulator to generate stress magnitude in the reservoir after hydraulic fracturing.

Embodiments herein relate to a method and system comprising of coupling a finite element geomechanic reservoir simulator and a reservoir simulator to generate stress magnitude in the reservoir after production for certain time period from the reservoir.

Embodiments herein relate to a method and system comprising of coupling a finite element geomechanic reservoir simulator and a reservoir simulator to generate stress anisotropy in the reservoir after hydraulic fracturing.

Embodiments herein relate to a method and system comprising of coupling a finite element geomechanic reservoir simulator and a reservoir simulator to generate stress anisotropy in the reservoir after production for certain time period from the reservoir.

Embodiments herein relate to a workflow to model the impact of stress perturbation in the reservoir due to stimulation and production using the finite element reservoir simulation in order to predict the hydraulic fracture geometry in refracturing and in-fill well fracturing operation.

Embodiments herein relate to a method and system that allows reservoir gridding and production simulation from two hydraulic fracture geometries originating from the same perforation cluster or different perforation cluster accounting for regular hydraulic fractures and new fractures from re-fracturing.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the system and method for generating a hydraulic fracture growth pattern are described with reference to the following figures. The figures are not necessarily to scale and certain features and certain views of the figures may be shown exaggerated in scale or in schematic in the interest of clarity and conciseness.

FIGS. 1.1-1.4 are schematic views illustrating various oilfield operations at a wellsite;

FIGS. 2.1-2.4 are schematic views of wellsite data collected by the operations of FIGS. 1.1-1.4;

FIG. 3.1 is a schematic view of a wellsite illustrating fracture operations for a fracture network;

FIG. 3.2 is a schematic diagrams illustrating microseismic monitoring of the fracture network;

FIGS. 4.1 and 4.2 are schematic diagrams depicting simulation workflows;

FIGS. 5.1 and 5.2 are schematic diagrams depicting integration of fracture and reservoir simulators, respectively, with a finite element geomechanic simulator;

FIGS. 5.3-5.4 are schematic diagrams depicting various views of another integration of fracture, production, and reservoir simulators, respectively, with a finite geomechanic simulator;

FIG. 5.5 is a schematic diagram depicting integration of fracture and reservoir simulations;

FIGS. 5.6-5.8 are schematic diagrams depicting various gridding geometries;

FIGS. 6.1-6.2 is a flow chart depicting a method of performing an integrated wellsite operation;

DETAILED DESCRIPTION

Figure 7:
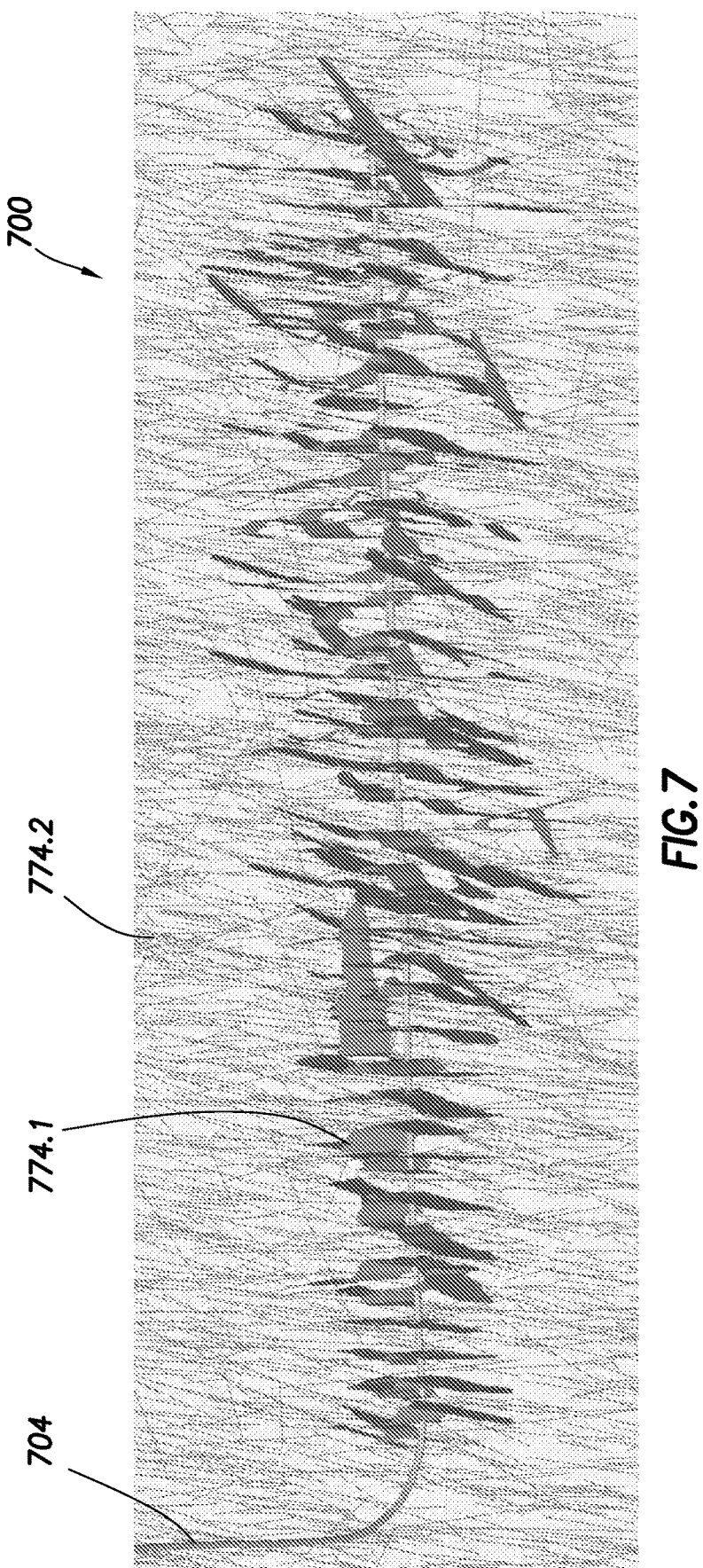
FIG. 7 is a plot depicting a modeled complex fracture network.

The description that follows includes exemplary apparatuses, methods, techniques, and instruction sequences that embody techniques of the inventive subject matter. However, it is understood that the described embodiments may be practiced without these specific details.

The disclosure relates to methods and systems for designing oilfield operations, such as fracture and production operations. The methods use geomechanical parameters, such as microseismic events, formation stresses, and reactive fracture displacement, based on fracture wellsite parameters (e.g., temperature, pressure, and fracture geometry) and reservoir wellsite parameters (e.g., pressure, flow rate, and permeability) to determine production parameters (e.g., pressure, production flow rate, and permeability). The methods and systems may be performed by coupling various simulators, such as a fracture simulator (e.g., UFM™, MANGROVE™), a reservoir simulator (e.g., INTERSECT™ or ECLIPSE™), a production simulator (e.g., INTERSECT™ or ECLIPSE™), a geomechanic (or finite element) simulator (e.g., VISAGE™) and/or other simulators (e.g., MANGROVE™ and/or PETREL™), to generate updated fracture parameters (e.g., microseismic events, stress planes of a natural fracture network) resulting from stress changes at the wellsite. Modeling software and/or simulators that may be used, such as UFM™, INTERSECT™, ECLIPSE™ VISAGE™ MANGROVE™ and PETREL™, are commercially available from SCHLUMBERGER TECHNOLOGY CORPORATION™ at www.slb.com.

The integration of the simulators seeks to combine an understanding of the fracture, formation, and reservoir parameters of the wellsite with geomechanical parameters of the wellsite to optimize a MEM of the wellsite. The fracture, formation, and reservoir parameters are combined by forming a finite element grid from a simulated fracture applied to a reservoir grid. With this understanding of the MEM, wellsite operations may be designed and performed to optimize fracture and production operations. The methods herein seek to provide an avenue for leveraging knowledge from separate systems which consider distinct aspects of the oilfield analysis (e.g., fracture and reservoir) in an integrated format with geomechanical features of the wellsite for use in optimizing fracture and production operations and generating synergistic results.

The methods and systems described herein may be used to predict microseismic events at a wellsite, such as those that occur due to pressure and stress changes in wells completed in an unconventional reservoir. The reservoir pressure and stress changes may be triggered through induced hydraulic fractures and/or production extraction from an existing well. The predicted microseismic events may be used to design wellsite operations, such as fracture and production operations. These predictions may be done using finite element modeling and reservoir simulations for evaluating the impact of stress changes on naturally fractured reservoirs due to hydraulic fracture stimulation and/or production at the wellsite.

The methods and systems described herein may be used to solve the problem of predicting the microseismic events which can then be utilized to calibrate the geomechanical and geostatic model with characteristics of a discrete fracture network (DFN). Reservoir parameters, such as the stimulated reservoir volume (SRV), can be predicted prior to the real acquisition of microseismic data. SRV calculated from microseismic-event distributions may be used in the industry to establish correlations with the production for oil and gas reservoirs. Although applicable in reservoirs where complex fracture networks are created, the calculation of SRV numbers may also be a valuable measure of the stimulation effectiveness and, in some circumstances, prediction of the well's production. Also, the extent of the SRV can help in determining fracture parameters, such as well spacing and stage spacing. This may be used in making decisions used in designing oilfield operations.

Oilfield Operations

FIGS. 1.1-1.4 depict various oilfield operations that may be performed at a wellsite, and FIGS. 2.1-2.4 depict various information that may be collected at the wellsite. FIGS. 1.1-1.4 depict simplified, schematic views of a representative oilfield or wellsite 100 having subsurface formation 102 containing, for example, reservoir 104 therein and depicting various oilfield operations being performed on the wellsite 100. FIG. 1.1 depicts a survey operation being performed by a survey tool, such as seismic truck 106.1, to measure properties of the subsurface formation. The survey operation may be a seismic survey operation for producing sound vibrations. In FIG. 1.1, one such sound vibration 112 generated by a source 110 reflects off a plurality of horizons 114 in an earth formation 116. The sound vibration(s) 112 may be received by sensors, such as geophone-receivers 118, situated on the earth's surface, and the geophones 118 produce electrical output signals, referred to as data received 120 in FIG. 1.1.

In response to the received sound vibration(s) 112, and representative of different parameters (such as amplitude and/or frequency) of the sound vibration(s) 112, the geophones 118 may produce electrical output signals containing data concerning the subsurface formation. The data received 120 may be provided as input data to a computer 122.1 of the seismic truck 106.1, and responsive to the input data, the computer 122.1 may generate a seismic and microseismic data output 124. The seismic data output may be stored, transmitted or further processed as desired, for example by data reduction.

FIG. 1.2 depicts a drilling operation being performed by a drilling tool 106.2 suspended by a rig 128 and advanced into the subsurface formations 102 to form a wellbore 136 or other channel. A mud pit 130 may be used to draw drilling mud into the drilling tools 106.2 via flow line 132 for circulating drilling mud through the drilling tools 106.2, up the wellbore 136 and back to the surface. The drilling mud may be filtered and returned to the mud pit. A circulating system may be used for storing, controlling or filtering the flowing drilling muds. In this illustration, the drilling tools are advanced into the subsurface formations to reach reservoir 104. Each well may target one or more reservoirs. The drilling tools 106.2 may be adapted for measuring downhole properties using logging while drilling tools. The logging while drilling tool may also be adapted for taking a core sample 133 as shown, or removed so that a core sample may be taken using another tool.

A surface unit 134 may be used to communicate with the drilling tools and/or offsite operations. The surface unit may communicate with the drilling tools to send commands to the drilling tools 106.2, and to receive data therefrom. The surface unit may be provided with computer facilities for receiving, storing, processing, and/or analyzing data from the operation. The surface unit 134 may collect data generated during the drilling operation and produce data output 135 which may be stored or transmitted. Computer facilities, such as those of the surface unit 134, may be positioned at various locations about the wellsite and/or at remote locations.

Sensors (S), such as gauges, may be positioned about the oilfield to collect data relating to various operations as described previously. As shown, the sensor (S) may be positioned in one or more locations in the drilling tools 106.2 and/or at the rig 128 to measure drilling parameters, such as weight on bit, torque on bit, pressures, temperatures, flow rates, compositions, rotary speed and/or other parameters of the operation. Sensors (S) may also be positioned in one or more locations in the circulating system.

The data gathered by the sensors (S) may be collected by the surface unit 134 and/or other data collection sources for analysis or other processing. The data collected by the sensors (S) may be used alone or in combination with other data. The data may be collected in one or more databases and/or transmitted on or offsite. All or select portions of the data may be selectively used for analyzing and/or predicting operations of the current and/or other wellbores. The data may be historical data, real time data or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering analysis. The reservoir, wellbore, surface and/or processed data may be used to perform reservoir, wellbore, geological, and geophysical or other simulations. The data outputs from the operation may be generated directly from the sensors, or after some preprocessing or modeling. These data outputs may act as inputs for further analysis.

The data may be collected and stored at the surface unit 134. One or more surface units 134 may be located at the wellsite, or connected remotely thereto. The surface unit 134 may be a single unit, or a complex network of units used to perform the data management functions throughout the oilfield. The surface unit 134 may be a manual or automatic system. The surface unit 134 may be operated and/or adjusted by a user.

The surface unit may be provided with a transceiver 137 to allow communications between the surface unit 134 and various portions of the current oilfield or other locations. The surface unit 134 may also be provided with or functionally connected to one or more controllers for actuating mechanisms at the wellsite 100. The surface unit 134 may then send command signals to the oilfield in response to data received. The surface unit 134 may receive commands via the transceiver 137 or may itself execute commands to the controller. A processor may be provided to analyze the data (locally or remotely), make the decisions and/or actuate the controller. In this manner, operations may be selectively adjusted based on the data collected. Portions of the operation, such as controlling drilling, weight on bit, pump rates or other parameters, may be optimized based on the information. These adjustments may be made automatically based on computer protocol, and/or manually by an operator. In some cases, well plans may be adjusted to select optimum operating conditions, or to avoid problems.

FIG. 1.3 depicts a wireline operation being performed by a wireline tool 106.3 suspended by the rig 128 and into the wellbore 136 of FIG. 1.2. The wireline tool 106.3 may be adapted for deployment into a wellbore 136 for generating well logs, performing downhole tests and/or collecting samples. The wireline tool 106.3 may be used to provide another method and apparatus for performing a seismic survey operation. The wireline tool 106.3 of FIG. 1.3 may, for example, have an explosive, radioactive, electrical, or acoustic energy source 144 that sends and/or receives electrical signals to the surrounding subsurface formations 102 and fluids therein.

The wireline tool 106.3 may be operatively connected to, for example, the geophones 118 and the computer 122.1 of the seismic truck 106.1 of FIG. 1.1. The wireline tool 106.3 may also provide data to the surface unit 134. The surface unit 134 may collect data generated during the wireline operation and produce data output 135 which may be stored or transmitted. The wireline tool 106.3 may be positioned at various depths in the wellbore 136 to provide a survey or other information relating to the subsurface formation.

Sensors (S), such as gauges, may be positioned about the wellsite 100 to collect data relating to various operations as described previously. As shown, the sensor (S) is positioned in the wireline tool 106.3 to measure downhole parameters which relate to, for example porosity, permeability, fluid composition and/or other parameters of the operation.

FIG. 1.4 depicts a production operation being performed by a production tool 106.4 deployed from a production unit or Christmas tree 129 and into the completed wellbore 136 of FIG. 1.3 for drawing fluid from the downhole reservoirs into surface facilities 142. Fluid flows from reservoir 104 through perforations in the casing (not shown) and into the production tool 106.4 in the wellbore 136 and to the surface facilities 142 via a gathering network 146.

Sensors (S), such as gauges, may be positioned about the oilfield to collect data relating to various operations as described previously. As shown, the sensor (S) may be positioned in the production tool 106.4 or associated equipment, such as the Christmas tree 129, gathering network 146, surface facilities 142 and/or the production facility, to measure fluid parameters, such as fluid composition, flow rates, pressures, temperatures, and/or other parameters of the production operation.

While simplified wellsite configurations are shown, it will be appreciated that the oilfield or wellsite 100 may cover a portion of land, sea and/or water locations that hosts one or more wellsites. Production may also include injection wells (not shown) for added recovery or for storage of hydrocarbons, carbon dioxide, or water, for example. One or more gathering facilities may be operatively connected to one or more of the wellsites for selectively collecting downhole fluids from the wellsite(s).

It should be appreciated that FIGS. 1.1-1.4 depict tools that can be used to measure not only properties of an oilfield, but also properties of non-oilfield operations, such as mines, aquifers, storage, and other subsurface facilities. Also, while certain data acquisition tools are depicted, it will be appreciated that various measurement tools (e.g., wireline, measurement while drilling (MWD), logging while drilling (LWD), core sample, etc.) capable of sensing parameters, such as seismic two-way travel time, density, resistivity, production rate, etc., of the subsurface formation and/or its geological formations may be used. Various sensors (S) may be located at various positions along the wellbore and/or the monitoring tools to collect and/or monitor the desired data. Other sources of data may also be provided from offsite locations.

The oilfield configuration of FIGS. 1.1-1.4 depict examples of a wellsite 100 and various operations usable with the techniques provided herein. Part, or all, of the oilfield may be on land, water and/or sea. Also, while a single oilfield measured at a single location is depicted, reservoir engineering may be utilized with any combination of one or more oilfields, one or more processing facilities, and one or more wellsites.

FIGS. 2.1-2.4 are graphical depictions of examples of data collected by the tools of FIGS. 1.1-1.4, respectively. FIG. 2.1 depicts a seismic trace 202 of the subsurface formation of FIG. 1.1 taken by seismic truck 106.1. The seismic trace 202 may be used to provide data, such as a two-way response over a period of time. FIG. 2.2 depicts a core sample 133 taken by the drilling tools 106.2. The core sample may be used to provide data, such as a graph of the density, porosity, permeability or other physical property of the core sample over the length of the core. Tests for density and viscosity may be performed on the fluids in the core at varying pressures and temperatures. FIG. 2.3 depicts a well log 204 of the subsurface formation of FIG. 1.3 taken by the wireline tool 106.3. The wireline log may provide a resistivity or other measurement of the formation at various depths. FIG. 2.4 depicts a production decline curve or graph 206 of fluid flowing through the subsurface formation of FIG. 1.4 measured at the surface facilities 142. The production decline curve may provide the production rate Q as a function of time t.

The respective graphs of FIGS. 2.1, 2.2, and 2.3 depict examples of static measurements that may describe or provide information about the physical characteristics of the formation and reservoirs contained therein. These measurements may be analyzed to define properties of the formation(s), to determine the accuracy of the measurements and/or to check for errors. The plots of each of the respective measurements may be aligned and scaled for comparison and verification of the properties.

FIG. 2.4 depicts an example of a dynamic measurement of the fluid properties through the wellbore. As the fluid flows through the wellbore, measurements are taken of fluid properties, such as flow rates, pressures, composition, etc. As described below, the fracture and reservoir measurements may be analyzed and used to generate models of the subsurface formation to determine characteristics thereof. Similar measurements may also be used to measure changes in formation aspects over time.

FIGS. 3.1 and 3.2 show example fracture operations that may be performed about the wellsite 100. The oilfield configurations of FIGS. 3.1-3.2 depict examples of the wellsite 100 and various operations usable with the techniques provided herein. FIG. 3.1 shows an example fracture operation at the wellsite 100 involving the injection of fluids into the wellbore 136 in the subterranean formation 302 to expand the fracture network 306 propagated therein. The wellbore 136 extends from a wellhead 308 at a surface location and through the subterranean formation 302 therebelow. The fracture network 306 extends about the wellbore 136. The fracture network 306 includes various fractures positioned about the formation, such as natural fractures 305, as well as hydraulic fractures 307 created during fracturing.

Fracturing is performed by pumping fluid into the formation using a pump system 329. The pump system 329 is positioned about the wellhead 308 for passing fluid through a fracture tool (e.g., tubing) 342. The pump system 329 is depicted as being operated by a field operator 327 for recording maintenance and operational data and/or performing maintenance in accordance with a prescribed maintenance plan. The pumping system 329 pumps fluid from the surface to the wellbore 136 during the fracture operation.

The pump system 329 includes a plurality of water tanks 331, which feed water to a gel hydration unit 333. The gel hydration unit 333 combines water from the tanks 331 with a gelling agent to form a gel. The gel is then sent to a blender 335 where it is mixed with a proppant (e.g., sand or other particles) from a proppant transport 337 to form a fracturing (or injection) fluid. The gelling agent may be used to increase the viscosity of the fracturing fluid, and to allow the proppant to be suspended in the fracturing fluid. It may also act as a friction reducing agent to allow higher pump rates with less frictional pressure.

The fracturing fluid is then pumped from the blender 335 to the treatment trucks 320 with plunger pumps as shown by solid lines 343. Each treatment truck 320 receives the fracturing fluid at a low pressure and discharges it to a common manifold 339 (sometimes called a missile trailer or missile) at a high pressure as shown by dashed lines 341. The missile 339 then directs the fracturing fluid from the treatment trucks 320 to the wellbore 136 as shown by solid line 315. One or more treatment trucks 320 may be used to supply fracturing fluid at a desired rate.

Each treatment truck 320 may be normally operated at any rate, such as well under its maximum operating capacity. Operating the treatment trucks 320 under their operating capacity may allow for one to fail and the remaining to be run at a higher speed in order to make up for the absence of the failed pump. A computerized control system may be employed to direct the entire pump system 329 during the fracturing operation.

Various fluids, such as conventional stimulation fluids with proppants (slurry), may be pumped into the formation through perforations along the wellbore to create fractures. Other fluids, such as viscous gels, "slick water" (which may have a friction reducer (polymer) and water) may also be used to hydraulically fracture shale gas wells. Such "slick water" may be in the form of a thin fluid (e.g., nearly the same viscosity as water) and may be used to create more complex fractures, such as multiple micro-seismic fractures detectable by monitoring.

During a fracture treatment, sufficient pad fluid (injection fluid without proppant) may be first pumped to create a sufficiently long fracture to provide effective enhancement to the reservoir flow, followed by slurry to fill the fracture with proppant suspended in the carrier fluid. As pumping ceases, the fluid in the slurry gradually leaks off into the formation, leaving the proppant in the fracture to provide a highly conductive channel to enhance the hydrocarbon production into the well.

Fracture operations may be designed to facilitate production from the wellsite. In particular, injection may be manipulated by adjusting the material being injected and/or the way it is injected to achieve the fractures which draws fluid from formations into the wellbore and up to the surface. When a fluid is pumped into a formation at a high rate, the natural permeability of the formation may not be sufficient to accept the injected fluid without requiring extremely high injection pressure, which may lead to the fluid pressure exceeding the minimum in-situ stress to create one or more tensile fractures from the wellbore or perforations. Once a tensile fracture is initiated, the fracture faces may separate and the fracture front may propagate away from the injection point, increasing the fracture length, height and width to create the storage volume for the injected fluid. In order to design the fracture treatment with effective fracture operations to achieve the desired fractures, methods described herein seek to capture the fundamental physics of the fracturing process as is described further herein.

As also shown in FIG. 3.1 (as well as FIGS. 1.1-1.4), the wellsite 100 may be provided with sensors (S) to measure wellsite parameters, such as formation parameters (e.g., mechanical properties, petrophysical properties, geological structure, stresses, in situ stress distribution, permeability, porosity, natural fracture geometry, etc.), fracture parameters (e.g., pump rate, volume (e.g., pad fluid and slurry), fracture geometry (e.g., propped fracture length), concentration of the proppant etc.), fluid parameters (e.g., viscosity, composition, proppant, temperature, density, etc.), reservoir parameters (e.g., pressure, temperature, viscosity), equipment parameters, and/or other parameters as desired. The sensors (S) may be gauges or other devices positioned about the oilfield to collect data relating to the various operations.

Various sensors (S) may be located at various positions along the wellbore and/or the monitoring tools to collect and/or monitor the desired data. Other sources of data may also be provided from offsite locations.

As schematically shown in FIG. 3.1, the sensors S may be part of or include a geophone 347 in an adjacent wellbore 346 and/or a logging tool 349 in the wellbore 136 for measuring seismic activity of the wellsite. The geophone 347, logging tool 349, and/or other tools may be used to generate seismic data that may be used to detect microseismic events 348 about the fracture network 306 as shown in FIG. 3.2. These events 348 may be mapped using conventional techniques to determine fracture parameters, such as fracture geometry.

Oilfield Simulation

Oilfield simulations may be used to perform modeled oilfield operations before equipment is deployed and actions are taken at the wellsite. Based on such simulations, adjustments may be made in the operations to generate optimal results and/or to address potential problems that may occur. Examples of simulation software that are used in the oilfield to simulate oilfield operations include MANGROVE™ and PETREL™ (or PETREL™ E&P). Oilfield software, such as PETREL™, may be used as a platform for supporting various aspects of oilfield simulation, such as fracture and/or production simulations.

Fracture simulation software, such as MANGROVE™, may be used to simulate fracture operations (or engineered stimulation design) alone or within the software platform. For example, fracture simulators may be used to integrate seamlessly with comprehensive seismic-to-simulation workflows in both conventional and unconventional reservoirs. The fracture simulator may be used, for example, to tell operators and users where to place fracturing stages, how hydraulic fractures interact with natural fractures, where fluid and proppant are in the fractures is, and how much the wells will produce in time.

The present disclosure seeks to integrate fracture stimulation design provided by fracture simulators, such as MANGROVE™, with seismic, geological, geophysical, geomechanical, petrophysical, microseismic fracture mapping, and reservoir engineering provided in the software platform. Wellsite parameters, such as formation characteristics, rock compressive strength, and regional stress patterns—three factors affecting fracture geometry, may be taken into account for the stimulation design. The fracture simulators may estimate, for example, fluid and proppant placement in the sub-surface rock.

Hydraulic fracture network dimensions and reservoir penetration may be based on detailed rock fabric characteristics and geomechanical properties along with treatment properties, such as fluid rheology, leakoff, permeability, and closure stress. After fracture design is completed, it may be coupled to the reservoir simulation in a seamless manner to allow operators to optimize the treatments for maximized productivity. MANGROVE™ stimulation design is a fracturing model platform that enables automated unstructured gridding to model complex hydraulic fractures for reservoir simulation. The reservoir simulator (e.g., INTERSECT™) may be coupled to the hydraulic fracture models (e.g., in MANGROVE™) providing a smooth link from completion to reservoir engineering. Examples of modeling using MANGROVE™ are provided in U.S. Pat. No. 9,228,425, the entire contents of which are hereby incorporated by reference herein.

FIGS. 4.1 and 4.2 show example embodiments of simulation workflows 400.1, 400.2.

FIG. 4.1 shows an integrated seismic to simulation workflow 400.1 that may be used for well completions, fracture design and production evaluation. The workflow 400.1 combines separate work flows 450.1-450.8 for structure lithology, discrete fracture network, geomechanical model, staging and perforating, complex hydraulic fracture models, microseismic mapping, automated gridding, and reservoir simulation, respectively.

FIG. 4.2 shows another example workflow 400.2. As schematically shown, the workflow 400.2 includes events 451.1-451.7 of a hydraulic fracture workflow, such as one used in MANGROVE™. The events include 451.1 creating a geological model with reservoir and rock properties, 451.2 designing completions (e.g., stages, perforations), 451.3 performing hydraulic fracture simulations (e.g., for planar and complex fractures), 451.4 matching microseismic and/or treatment data, 451.5 creating grids for reservoir simulation input (e.g., structure and unstructured grids), 451.6 running reservoir simulation (e.g., prediction and history match), and 451.7 performing uncertainty optimization (e.g., number of wells, stages, stimulation design, location and placement, reservoir characterization).

In general, the oil and gas reservoirs can be heterogeneous and have varied properties across the wellsite. Some of them may have medium to high permeability and some may have low permeability that does not produce, or may have low production after drilling the wellbore. Hydraulic fracturing has become a useful tool to extract oil and gas at economic rates from some of these complex, low permeability reservoirs. An example workflow for using simulations to design operations to facilitate production is depicted in FIG. 4.2.

In the hydraulic fracturing workflow 400.2, a geological model (or MEM) may be created with a definition of the structural lithology and reservoir parameters, such as permeability, porosity, fluid saturation distribution, and rock properties, such as minimum in-situ stress, Young's modulus, etc. If the formation is naturally fractured, then the geological model can also involve defining the location, length and azimuth of these natural fractures in the reservoir.

After the geological model is ready, well completion may be designed which may be apt and useful for the treatment execution for the conditions defined by the geological model. The well completion design may involve the segmentation of the wellbore into one or more stages in order to cover a pay section through one or multiple stages of hydraulic fracturing treatments. Apart from segmentation of the wellbore into one or more stages, the location of the actual perforations to be done may be identified at this stage, such that the hydraulic fractures may successfully initiate in these perforations and propagate to cover the desired pay section.

Achieving an optimal number and location of fracture treatment stages and perforation clusters may be a manual, time-intensive task. In tight reservoirs, the placement of perforation clusters may be done geometrically, without regard for variations in rock quality along the lateral. Simulators, such as MANGROVE™'s completion advisor module, may allow users to run mathematical algorithms to design the stages and perforations in an automated technique. The algorithms utilize detailed geomechanical, petrophysical, and geological data to select stage intervals and perforation locations. Based on criteria for reservoir and completion quality measurements provided by one skilled in the art, sweet spots for perforation clusters may be identified. Furthermore, respecting the user-provided reservoir, operational, and structural constraints, stages may be defined to keep rocks with similar reservoir properties together.

The design of the hydraulic fracture in the workflow involves creating treatment design scenarios with actual treatment fluid and proppant schedules. The simulation models may then run on these schedules to predict the fracture propagation, fluid and proppant placement and the ultimate fracture geometry achieved.

Simulators (e.g., MANGROVE™) may have built-in unconventional hydraulic fracture models like UFM™ (or other unconventional fracture models) to take into account the rock geomechanics and interaction of natural fractures in predicting the complex fracture geometry. Planar fracture models are also available for application in simple and non-complex cases where there is an absence of natural fractures in the reservoir.

Once the treatment is executed on the wellsite, the treatment data (e.g., treatment pressure, proppant concentration, pumping rates and microseismic hydraulic fracture monitoring data) can be used to re-calibrate the stimulation design model by matching the observed parameters against the predicted parameters from the simulation run. The matching exercise may require changing the reservoir properties in the geological model and/or changing the fracture design parameters and fluid properties.

Once a reasonable match of the predicted versus observed data is attained, the hydraulic fractures and the reservoirs may be gridded in structured or unstructured reservoir grids which serve as input for the reservoir simulation. The reservoir simulation may comprise either a production or a history match of the production data.

With the event of declining production over time from the wells that have been producing, at a certain timeframe intervention may be needed and/or techniques applied to boost the production for economic sustenance of the well's life. Due to such potential need to revive the declining production, refracturing techniques may be used to achieve uplift of production and hence longevity of the well's producing life. Infill wells may also be drilled in the area and hydraulic fractures placed on these new wells to drain additional oil and gas from the wellsite. The additional hydraulic fractures on the existing wells (refracturing) and infill wells (new hydraulic fracturing) aims to contact the parts of the reservoir undrained and undepleted by the original well.

The same treatment design may be applied to a number of wells in a field or part of the field, and the treatment revised to achieve an optimum design that provides the maximum net present value. The fracture parameters for single stage or multiple stage and single well or multiple wells are then optimized. Examples of such fracture parameters may be volume of fracturing fluid, fracturing proppants, number of stages that are to be hydraulically fractured, location and placement of the wellbore, etc.

Integrated Modeling

FIGS. 5.1-5.4 show various methods of generating integrated geomechanical parameters based on fracture, production, and reservoir simulations. FIGS. 5.1 and 5.2 show methods 500.1, 500.2 involving coupling a fracture simulator (e.g., UFM™) with a finite element simulator (e.g., VISAGE™). FIGS. 5.3 and 5.4 show methods 500.3, 500.4, 500.4' involving coupling a fracture simulator (e.g., UFM™) and a production simulator (e.g., INTERSECT™) with a finite element simulator (e.g., VISAGE™).

1. Fracture Integration

Hydraulic fracture propagation in a naturally fractured reservoir is a complex process that can be modeled through a fracture model, such as UFM™. Natural fracture reactivation and shear slippage may be possible when it meets induced hydraulic fractures. The interaction between the hydraulic fractures with the natural fractures may result in the generation of microseismic events when the hydraulic fracture treatment is pumped into the reservoir. The following US patents and PCT Patent Applications disclose aspects of this modeling, among other things, and each of the following are incorporated by reference herein in their entireties: U.S. Pat. No. 8,412,500; PCT/US2014/064205; Ser. Nos. 14/350,533; 14/664,362; U.S. Pat. No. 7,784,544; Ser. Nos. 12/462,244; 13/517,007; 14/004,612; 14/126,201; 14/356,369; 13/968,648; 14/423,235; PCT/US2013/076765; PCT/US2014/045182; U.S. Pat. Nos. 8,280,709; and 8,271,243.

The methods herein seek to provide techniques for integrating various aspects of the oilfield operation to further define the MEM and determine integrated wellsite parameters. This integration may be performed by coupling fracture simulation (e.g., the product/outputs of UFM™ in MANGROVE™) and a reservoir simulation (e.g., INTERSECT™, ECLIPSE™, etc.) with a geomechanical simulation (e.g., a finite element reservoir simulator, such as VISAGE™). These methods and systems may be used to predict, for example, microseimic events due to pressure and stress changes in wells completed in an unconventional reservoir. The reservoir pressure and stress changes can be triggered through induced hydraulic fractures or production extraction from an existing well.

The methods involve using legs of the simulation utilizing a finite element geomechanical simulator (e.g., VISAGE™). The legs may include: 1) integrating fracture simulation with geomechanical simulation, and 2) predicting microseismic events using production simulation. The 1) first leg involves creating hydraulic fracture simulations on wells using a fracture simulator (e.g., UFM™ in MANGROVE™ engineered stimulation design software), converting the hydraulic fracture planes into discrete fracture planes, gridding the reservoir in an unstructured grid format with the geomechanical properties, and applying finite element algorithms (e.g., VISAGE™) to compute the shear and tensile failure of the rock and associated description of the natural fracture network. The 2) second leg involves production simulation over existing wells drilled in the reservoir and applying finite element algorithms to estimate the stress changes with time that leads to shear and tensile failure of the rock. The resulting failure of the natural fractures may then be modeled to predict the microseismic event generation.

In accordance with an embodiment, FIG. 5.1 shows a graphical illustration of a schematic diagram of a method 500.1 of coupling the product/outputs of fracture simulation (e.g., UFM™ in MANGROVE™) into the finite element reservoir simulator (e.g., VISAGE™) to generate an integrated finite element simulation. The method 500.1 shows a workflow diagram representing the creation of synthetic microseismic events in conjunction to the MANGROVE™ workflow to predict microseismic events on hydraulic fracture treatment.

As shown, a zone set/structure grid 552 includes Young's modulus (YME), Poisson's ratio (PR), pore pressure (Pp), and in situ stresses (St). This grid is input into the fracture simulator 554.1 of the fracture simulator 556 to simulate a hydraulic fracture network 558.1. The hydraulic fracture network 558.1 and a discrete fracture network 559 are coupled to the finite element simulator 560. The finite element simulator 560 may be used to generate outputs 562, such as natural fracture reactivation (CFF), synthetic microseismic (MCS), and in situ stresses post-fracturing (St, hf).

In accordance with another embodiment, FIG. 5.2 below is a graphical illustration of a method 500.2 depicting product/outputs of the fracture simulation coupled into the finite element reservoir simulator. This figure depicts a workflow diagram representing the creation of synthetic microseismic events in conjunction with a reservoir simulator (e.g., ECLIPSE™) to predict microseismic events after production from existing wells.

In this example, the inputs 552 are shown as the rock properties (such as horizontal stress tensors, Young's Modulus, Poisson's ratio, pore pressure, hydraulic fracture network and natural fracture network). The inputs 552 are fed into a reservoir simulator 554.2 along with pore pressure after production (Pp, f). The reservoir simulator 554.2 and the discrete fracture network 559 are coupled to the finite element simulator 560. The reservoir simulator 554.2 generates reservoir outputs, such as flow grid 558.2, for input into the finite element simulation (560). The outputs 562 of the finite element simulation 560 are shown as synthetic microseismic events (MCS) and natural fractures (CFF) which have been reactivated and post stimulation state of stress in the reservoir. In accordance with this embodiment, the system may predict the natural fracture network shear failure due to stress change triggered by the production from existing wells. This may indicate that there is no need for any externally induced hydraulic fracture stimulation treatment.

The methods 500.1, 500.2 of FIGS. 5.1 and 5.2 may be combined to provide inputs from the fracture simulator 554.2 and the finite element simulator 560 to the same finite element simulator 560. This may be done, for example, by collecting wellsite data (e.g., 552) for gridding into both the fracture simulator 554.1 and the reservoir simulator 554.2. Each of the simulators 554.1, 554.2 may have processors and databases to collect and process the wellsite data and generate the simulator outputs 558.1, 558.2.

The simulator outputs 558.1, 558.2 may be combined and processed in a common or separate database and processor to be converted into a finite element format for input into the same finite element simulator 560. The combination of the outputs from the fracture simulator and the reservoir simulator may be achieved by integrating the data from each simulator in a manner that honors underlying features of the separate simulators while providing a means for combining the results for input into a finite element simulator (e.g., VISAGE™). This process may be used to integrate fracture, reservoir, and geomechanical features in a manner that provides a meaningful representation of the wellsite, and/or that may be used in designing/optimizing oilfield operations.

2. Production Integration

The same treatment (e.g., fracture) design may be applied to a number of wells in a field or part of an oilfield. Such treatment design may involve defining the number and location of fracturing stages, and associated perforation, injection, and/or other fracture parameters. The treatment may be revised to achieve an optimum design that provides a maximum net present value. Parameters (or variables) for single stage or multiple stages and single well or multiple wells may then be optimized. Examples of such parameters may be volume of fracturing fluid, fracturing proppants, number of stages that are to be hydraulically fractured, location and placement of the wellbore, etc.

With the event of declining production over time from the wells that have been producing, at a certain timeframe, it may be useful to intervene and apply techniques to boost the production for economic sustenance of a well's life. Due to a need to revive declining production, refracturing techniques may be useful in achieving uplift of production and hence longevity of the well's producing life. Another technique commonly applied in such scenarios is to drill an infill well in the area and place hydraulic fractures on these new wells to drain the additional oil and gas. The hydraulic fractures on the existing wells (refracturing) and infill wells (new hydraulic fracturing) aims to contact the undrained and undepleted parts of the reservoir.

In accordance with an embodiment, the product/outputs of fracture simulation (using, e.g., UFM™) are coupled into the finite element reservoir simulator (e.g., VISAGE™ which is commercially available from SCHLUMBERGER TECHNOLOGY CORPORATION™ of Sugar Land, Tex.). The disclosure describes methods and systems to predict stress magnitude and direction change due to production on existing wells and the production thereafter. This stress magnitude change can then be utilized in simulating the hydraulic fracture growth using a fracture simulator (e.g., UFM™). The application ranges from modeling hydraulic fracture footprint for both refracturing wells and in-fill well fracturing.

One embodiment of the methodology starts by combining 3D geomechanical models (e.g., VISAGE™) and a DFN to identify critically stressed natural fracture planes. This subset of the natural fractures serves as the input for the complex hydraulic fracture simulation using the UFM™ model, constrained by matching on-site pumping schedules, observed treatment pressures and the observed micro-seismic events footprint. The generated hydraulic fracture and its associated stimulated fracture system are then coupled to the reservoir simulator through a compatible unstructured gridding schemes for finite element geomechanical simulations that accounts for complex hydraulic fracture geometries. Re-fracturing and in-fill operations can then be assessed by updating the in-situ stress of the geomechanical model for relevant dates and re-running our methodology for the candidate wells.

To close the workflow, the refracturing operations require essentially capturing the hydraulic fracture properties from the initial fracture and the new fractures and use them as inputs to a reservoir simulator for production estimation. In order to capsulate the fluid and proppant distribution from both the initial and new fractures and account for the time difference between the treatments, the numerical simulation model may be able to handle the complex grid system. The grid may have the flexibility to turn on the fracture properties of the second set of hydraulic fractures in addition to the existing hydraulic fracture after the time the event of refracturing occurs.

By setting up this complete loop of fracture simulation to production modeling for the production causing reservoir depletion, re-fracturing treatments or in-fill well completions can be successfully modeled and predicted to achieve a true estimate of return on investment for well completion and drilling scenarios. Field observations indicate this methodology can provide important insights when developing holistic estimates of the estimated ultimate recovery (EUR) of an unconventional well.

A hydraulic fracture design model simulates the complex physical process of fracture propagation in the earth driven by fluid injected through a wellbore. Hydraulic fracture propagation in an oil and gas reservoir is a complex process that can be modeled through use of various fracture models, such as the conventional 2D and 3D models or the newly developed UFM, wiremesh, and planar3D models. An objective in these models is to adhere to the laws of physics governing surface deformation of created fractures subjected to fluid pressure, fluid flow in the gap formed by opposing fracture surfaces, propagation of the fracture front, transport of the proppant in the fracture carried by the fluid, and leakoff of the fracturing fluid into the permeable rock.

The mechanical properties and stress state in the reservoir serve as a critical input for hydraulic fracture models to predict hydraulic fracture geometry. Stress magnitude and direction around a hydraulically fractured production well reorients because of non-uniform depletion of the reservoir. Initially, a direction of maximum horizontal stress is aligned with the initial vertical hydraulic fracture. However, during production as the well depletes the reservoir, the maximum horizontal stress may decrease faster than the minimum horizontal stress because of higher depletion in the fracture direction, causing stress reversal to occur in the vicinity of the fracture face. With this reversal along with the stress magnitude, a second fracture (refracturing) may propagate in a direction different from the initial fracture. However, with treatment designs pumped, it may turn back to the original direction as it gets past the stress reversal regime.

Similarly for newly drilled wells (infill wells) in the area of an existing producing well, hydraulic fractures on these wells may have a preferential direction of growth as the medium may not be isotropic anymore due to the stress depletion around the pre-existing well. Hence, there are more chances for the hydraulic fractures on these infill wells to touch (frac hit) the pre-existing wells.

The method and system described in this document allows prediction of the stress magnitude and directional change in the reservoir created due to the hydraulic fracturing operation and the production thereafter. The simulation may be powered by a 3-dimensional finite element reservoir geomechanical simulator. The inputs for the simulation may include the original state of the reservoir and rock properties, hydraulic fracture geometry simulated by the fracture simulation models described above, location and mechanical properties of the natural fracture network and a numerical grid with the description of the depletion pressure state at the desired time step.

An example of a method usable to perform the simulation is shown in FIG. 5.3 which shows a graphical illustration of a schematic diagram of the method 500.3 involving coupling the product/outputs of fracture simulation (e.g., UFM™ in MANGROVE™) and a production simulator (e.g., INTERSECT™ or ECLIPSE™) into the finite element reservoir simulator (e.g., VISAGE™) to generate an integrated finite element simulation. The method 500.3 shows a workflow diagram representing integration of the fracture simulation and the production simulation for input into the geomechanical simulation to generate natural fracture reactivation and stresses. FIG. 5.3 schematically depicts a method of creating stress parameters, such as a new stress magnitude and orientation (tensors) on a structured grid. These parameters may be fed into fracture models in order to run refracture simulations and infill-well's fracture simulations.

As shown, the fracture simulator 556 generates the zone set/structure grid 552 and fracture models 553. The grid 552 and fracture models 553 generate a hydraulic fracture network 558.3. The hydraulic fracture network 558.3 is input into a production simulator 555 (e.g., INTERSECT™). The hydraulic fracture network 558.3, the discrete fracture network 559, and the production simulator 555 are coupled to the finite element simulator 560. The finite element simulator 560 may be used to generate outputs 562, such as natural fracture reactivation (CFF), synthetic microseismic (MCS), and in situ stresses post-fracturing (St, hf). These outputs 562 may be input back into the fracture simulator 556 and repeated for refracture and infill well fracture simulations.

In accordance with another embodiment, the product/outputs of the fracture simulation in MANGROVE™ are coupled into the finite element reservoir simulator. The inputs are the rock properties such as horizontal stress tensors, Young's Modulus, Poisson's ratio, pore pressure, hydraulic fracture network and natural fracture network. The outputs of the simulation are new stress magnitudes, stress tensors and natural fractures which have been reactivated so as to understand the critically stressed and non-critically stressed fracture networks.

FIG. 5.4 shows another method 500.4 for generating numerical simulations usable, for example, for refracturing. As shown in this view, the method 500.4 may involve generating various numerical simulations with reservoir gridding. This method 500.4 involves generating various inputs 561.1-561.5 for the finite element simulator 560. As shown, these inputs include geomechanical and geostatic models (e.g., initial stresses, reservoir and rock properties) 561.1, completion perforation and stages 561.2, fracture models (e.g., UFM™) 561.3, reservoir gridding 561.4, numerical simulation (e.g., on INTERSECT) 561.5. Each of the fracture inputs 561.1-561.5 may be combined as indicated by the arrows to the reservoir gridding 561.4 and the multiple numerical simulations 561.5. These inputs 561.1-561.5 may be used to define fracture parameters 557.1-557.5, such as zones, completions, stimulation cases, production grid, and simulation cases, respectively.

The system described herein seeks to solve the problem of predicting modified stress in the reservoir due to hydraulic fracturing processes and production though them. This may then be utilized to update the geomechanical and geostatic model in the form of a structured grid. The new fracture geometry for refracturing and in-fill well fracturing cases can thus be predicted using the structured grid properties as input. Such definitive prediction of the hydraulic fracture geometries can be been successfully used to establish design parameters, such as well-to-well distance and/or spacing, and/or stage spacing. Such design parameters may be used in order to optimize the completion design for a pad with multiple wells. It may also highlight the need to create new perforations and/or treatment diversion in the well for refracturing cases. Well and stage spacing problems for in-fill wells can be answered with this workflow.

In accordance with yet another embodiment, the system may be used to predict the natural fracture network shear failure due to stress changes triggered by the production form existing wells and the stress tensors and magnitude due to hydraulic fracturing and production from pre-existing wells.

This method and system allows performance of reservoir production from wells that have both regular fractures and re-fractures. This is achieved by first upscaling the pressure depletion and saturation properties into the original zone model, then updating the stresses in the zone model by utilizing the stress equation, creating a hybrid DFN that encompasses the natural fracture and the hydraulic fracture information and finally gridding the regular fractures and re-fractures into an unstructured grid.

The methodology starts by upscaling the depleted pressure state and saturation changes as the desired time step from an already run INTERSECT™ simulation. A stress equation is used to update the minimum horizontal stresses in the zone model. This is done because the hydraulic fracturing and subsequent production induces changes in the stress state in the reservoir model as described before. These stresses may be accounted for during the refracturing stimulation. The outcome of using the stress equation is to update the stresses in the zoneset. A methodology is then employed to create a hybrid fracture network that encompasses the natural fractures and the hydraulic fractures. This fracture network is used to simulate re-fractures from the refracture completions using the UFM engine. A user interface provides the ability to choose the regular fractures and the re-fractures to be passed on to the gridder. The gridder embeds the fracture geometry into an unstructured grid. The property values in the fracture regions of the grid are populated from the fractures. The fracture grid contains the fracture properties as well as the pressure depletion and saturation changes from the previous simulation run. A simulation run is performed using INTERSECT simulator to simulate post refracture production from both regular fractures and re-fractures.

FIG. 5.4 also shows an example method 500.4' with the upscaled, stress simulation usable, for example, in refracturing. The method 500.4' may be performed using the gridding and numerical simulations generated in the method 500.4 with additional integrated features, such as fracture and reservoir simulations. As shown in this version, the method 500.4' is used to format the simulation cases 557.5 for finite element simulation by converting pressure & saturation time steps to grid properties 551.1 and upscaling the unstructured grid to structured grid properties to zoneset 551.2. The zoneset 551.2 may be converted to a structured grid with updated stress magnitude and anisotropy 551.3 by simulation using the finite element simulator 560 or manually using known stress equations 560', such as conventional stress equations used in geomechanics. The structured grid 551.3 may be used to generate refracture completion inputs (e.g., perforation and stages) 551.4 and the defined production grid 557.4. The combined gridding 551.5 may be created by formatting the gridding into a 2D DFN and merging it with the existing 2D DFN 551.5.

The combined gridded DFN may be used as an input to UFM to generate a fracture model 551.6 to define a simulation case 557.5'. The simulation case 557.5' may then input into a reservoir simulator (e.g., INTERSECT™) to generate reservoir parameters (e.g., permeability, porosity, conductivity, etc.) and reservoir pressure and saturation properties. The reservoir gridding 551.7 may then be used to generate a numerical simulation 551.8 (using e.g., INTERSECT™). The numerical simulation 551.8 may be generated by performing enumeration run using pressure and saturation properties.

The system and/or methods, therefore, seek to provide the ability to model both regular hydraulic fractures and refractures on a grid, and run reservoir (e.g., INTERSECT™) simulations on the grid to simulate production post re-fracturing. This may involve coupling a finite element geomechanic reservoir simulator and a reservoir simulator to generate stress magnitude in the reservoir after hydraulic fracturing, coupling the finite element geomechanic reservoir simulator and the reservoir simulator to generate stress magnitude in the reservoir after production for a certain time period from the reservoir, coupling a finite element geomechanic reservoir simulator and a reservoir simulator to generate stress anisotropy in the reservoir after hydraulic fracturing, and/or coupling a finite element geomechanic reservoir simulator and a reservoir simulator to generate stress anisotropy in the reservoir after production for certain time period from the reservoir.

These methods may be used to model the impact of stress perturbation in the reservoir due to stimulation and production using the finite element reservoir simulation in order to predict the hydraulic fracture geometry in refracturing and in-fill well fracturing operation. These methods may also allow reservoir gridding and production simulation from two hydraulic fracture geometries originating from the same perforation cluster or different perforation cluster accounting for regular hydraulic fractures and new fractures from re-fracturing.

3. Gridding

FIG. 5.5 is a schematic diagram 500.3 depicting integration of outputs from the fracture simulator 554.1 and the reservoir simulation 554.2 to form an input (e.g., finite element grid) usable in the finite element simulator 560. The fracture simulation may be a hydraulic fracture network 558.1 and the reservoir simulation may be a control-volume flow grid 558.2.

These outputs 558.1, 558.2 from each of the fracture and reservoir simulators 554.1, 554.2 may be combined as shown in Stage I. As shown in Stage II, the control volume grids may be adapted around the simulated fracture 558.1 to alter the structure of the grid for finite element modeling. As shown in Stage III, the coupled fracture and reservoir simulations may be solved with compatible discretizations to generate a finite grid element 561. At Stage III, geomechanical parameters, such as stress and/or microseismic events that define a state of the formation and which may affect production, may be determined from the combined simulations.

After Stage III, production output 555.1 from the production simulator 555 may be considered in the generated finite element grid 561. Such production output 555.1 from the production simulator 555 may be in the form of a production plot (see, e.g., FIG. 8). Stages IV and V, respectively, show further refinements 561', 561" of the finite element grid 561 of Stage III. Stage IV and V show the updated stresses in the model resulting from depletion of production from the formation as indicated by the production output 555.1 over time. These show the changes in stresses for the MEM that occur as a result of such depletion. These stresses may be generated by applying the pressure steps from the production simulator 555 to each of the grid lines of Stage III as schematically shown.

The integration of diagram 500.3 may be performed using the gridding shown in FIGS. 5.4-5.6. These figures show mapping of unconventional grids, such as those portions of the grids of FIGS. 5.3 around the hydraulic fracture network 558.1 that deviate from the square flow grid 558.2 of the reservoir simulators. Meshes from the fracture simulator and the reservoir simulator may be combined such that grid lines can overlay to map information between the fracture simulator and the reservoir simulator. The unconventional grids provide a means for incorporating the fracture network 558.1 into the reservoir grid 558.2 in a manner that takes into consideration the features of both simulations, thereby providing mesh compatibility between the simulations.

Given the impact of hydraulic fracture geometry on the productivity of unconventional wells, the flow simulation is carried out on a grid that honors the existence of high conductivity zones in a vicinity of the hydraulic fracture network. This may be achieved by employing an unstructured grid that is gradually refined as the domain approached the hydraulic fracture. In the example of FIG. 5.3, the grid is initially rectangular, and conforms to polygonal shapes in an area adjacent the fracture network. This example uses a flow simulator that employs an efficient control-volume (CV) discretization of the reservoir that leads to polygonal grid cells.

In order to couple the reservoir model having the CV discretization scheme with a stress simulator, an equivalent numerical representation is identified. This may be done by finding a new discretization that: a) is compatible with the numerical approach to solve for the stress solution, b) minimizes the loss of information or equivalence with the discretization of the flow problem, and/or c) that provides enough mesh quality (grid cell aspect ratios, skewedness, among others) to avoid undesired numerical artifacts. In the simulator coupling, a mesh compatibility strategy is presented to address these constraints.

The polyhedral grid cells (from the flow model) may be decomposed into a combination of tretrahedra (4 faces), pentahedra (5 faces) and hexahedra (6 faces), to be represented as valid grid cells types ("elements") for a finite element discretization of the stress solution. The approach starts by scanning each of the flow model grid cells and counting the number of faces. If the number of faces is between 4 and 6, the flow grid cell has an exact equivalence to a stress simulation grid cell (3D polytope has 4 or more faces). If the grid cells have more than 6, a new node is added at the center of mass of each of the faces containing more than 4 nodes and the face is subdivided in triangles. Regardless of the number of faces with more than 4 nodes, all nodes may now be connected to another newly placed node at the center of mass of the original grid cell and a series of tetra and pentahedra will be generated.

In some situations, the gridding is altered. For example, in cases where all faces have been subdivided into triangles, each node of each triangle of each face may then connect to a new node placed at the center of mass of the original grid cell, thereby subdividing the polygon grid cell into a collection of just tetrahedrals as shown in FIG. 5.4. FIG. 5.4 shows a grid cell 563 (left) with more than 4 faces. The face FA is subdivided into triangles by placing an additional point (vertex $P_f$) at the center of mass of FA. New tetrahedral grid cells are created (right) by connecting each of the 3 nodes of sub-faces $F_iA$ to another newly placed point Pc at the center of mass of the original grid cell. This process is repeated for each face.

In another case shown in FIG. 5.5, an originally-prismatic grid cell 563' has two congruent faces $F_A$, $F_B$. These faces are subdivided into triangles $F_{1-6}A$, allowing for a purely pentahedral representation for the finite element solution. In the original prismatic grid cell 563' (left), the two congruent faces $F_A$ and $F_B$ have been subdivided into triangles by placing an additional point (vertex $P_fA$) at their respective center of mass. New pentahedral grid cells $F_{1-6}A$ are created (right) by connecting each of the 3 nodes of sub-faces $F_iA$ to their corresponding points of the counterpart sub-face $F_iB$.

Once all original grid cells have been scanned and (if necessary) subdivided, a mapping function may be created to allow the flow of information (e.g., rock properties and states, i.e., pressures, stresses, temperatures) between the parent grid cells (from the flow simulation) to the child grid cells (for the finite element stress simulation). This mapping function may be used: 1) at the creation of the stress model to assign properties from the original grid to the finite element grid, and 2) after the simulation, to map results back from the stress simulation grid to the flow grid or any other spatially-referenced repository (i.e. any other grid, log, intersection, surface, etc.). This mapping may allow to the stress simulation results to be consumed by the flow simulation and/or by any other post-processing application/workflow.

FIG. 5.6 schematically shows mapping of communication between parent and child grid cells. After subdivision, a mapping function (graph) is preserved to allow for data flow between the flow grid (FIG. 5.1) and stress simulation grid (FIG. 5.2) as indicated by the dashed lines. Each new grid cell $C_i$ "knows" of its parent grid cell, for example, C1 to C6 can retrieve and provide data to cell $C1^0$, while grid cells C7 to C12 will do so with $C2^0$. This representation allows minimal loss of information during information transfer between grids. Using this mapping of unconventional grid cells, information may be passed between the simulators.

Integrated Wellsite Operations

FIGS. 6.1-6.2 show a flow chart depicting a method 600 for performing an integrated wellsite operation which may be used to couple simulations of aspects of the oilfield to predict fracture parameters and to perform fracture and production operations based on such predictions. The flow chart is shown in two portions with breakaway lines A, B, C connecting FIGS. 6.1-6.2. The method 600 involves 650 collecting wellsite data, such as the data depicted in FIGS. 1.1-3.4. The wellsite data may be collected for input into the grids 552 of FIGS. 5.1 and 5.2.

Examples of data that may be collected include historical data, data from third parties, measured data, simulated or estimated data, observations, etc. The wellsite data may include, for example, mechanical properties, petrophysical properties, geological structure, stresses, in situ stress distribution, permeability, porosity, natural fracture geometry, etc. The wellsite data may include fracture parameters, such as perforation clusters, stages of pumping, pumping rates, fracturing fluid types, fluid viscosity, proppant type, treating pressures, surface fluid temperatures and rock properties. These fracture parameters may provide information to determine the hydraulic fracture propagation as shown, for example, in FIG. 5.1. Such data may be gathered from historical, customer, other wellsites, measurements, and/or other sources. Computerized systems may be available on the wellsite to collect real-time measurements and information about the pumping job. The collected data may include seismic (and/or microseismic) data measured at the wellsite, such as logging data and/or data measured using geophones. Such seismic data may be mapped as shown in FIG. 3.4.

The wellsite may also include the MEM. The MEM may be a model that is provided, or may be calculated from the other wellsite data. The MEM is a numerical representation of the geomechanical state of the wellsite (e.g., reservoir, field, and/or basin). In addition to property distribution (e.g., density, porosity) and fracture system, the model may incorporate wellsite parameters, such as pore pressures, state of stress, rock mechanical properties, etc. The stresses on the formation may be caused by overburden weight, any superimposed tectonic forces, and by production and injection. The MEM may be built using geomechanical oilfield software, such as PETREL™, or other geomechanical techniques using conventional software as is understood by those of skill in the art.

I. Fracture Parameters

The method 600 involves 662.1 generating fracture parameters based on wellsite data, and 662.2 determining reservoir parameters based on the wellsite data and the determined fracture parameters. The 662.1 fracture wellsite parameters may comprise fracture parameters, such as pump rate, volume (e.g., pad fluid and slurry), fracture geometry (e.g., propped fracture length), concentration of the proppant etc., injection fluid parameters (e.g., viscosity, composition, proppant, temperature, density, etc.).

Hydraulic fracture propagation in the reservoir results from the injection of fracturing fluid and proppants into the surface formation as shown, for example, in FIG. 3.1. A fracturing fluid may be mixed in water tanks that can be fed through a gel hydration unit that combines gel and other additives to form the fracturing fluid. The missile manifold carries the fracturing fluid into the high pressure pumps and the field operator uses these high pressure pumps on surface to pump the fracturing fluids to the wellhead through the missile manifold. The pressure generated by the surface pumps is transmitted though the means of the fluid to the rock face in the subsurface as it traverses past the wellhead into the wellbore. Once the rock succumbs to the pressure as it is increased above the in-situ-stress, the fracture initiates and starts to propagate in the reservoir.

The generating 662.1 may involve measuring the fracture parameters at the wellsite, for example, by deploying a downhole tool into the wellbore to perform measurements of subsurface formations. For example, as shown in FIG. 3.1, measuring may be performed, for example, using a geophone, logging, and/or other tool to take seismic measurements and/or sense seismic anomalies in the formation. The seismic measurements may be used to generate the microseismic events as shown in FIG. 3.2. These microseismic events may be mapped using conventional techniques as is understood by one of skill in the art.

The generating 662.1 may involve modeling fracture parameters by solving governing equations for the wellsite data for the formation to be fractured. Simulation techniques, such as the Unconventional Fracture Model (UFM using UFM™ or other simulator), may be applied to these input parameters from the wellsite to predict the equivalent behavior of rock deformation causing the hydraulic fracture propagation.

Rate of pumping and amount of fluid pumped on the surface is the measure of the extension created in the hydraulic fractures. As the fracturing fluid pumping treatment continues for some duration (e.g. around a couple of hours), the hydraulic fracture extension, the fluid and proppant flow in the fractures is determined from simulation on the collected wellsite information. The sequence of increasing the proppant concentration on the surface is also a parameter that may be recorded while pumping. The proppant concentration increment causes increase in the hydraulic fracture conductivity as proppants fill up the fractured volume.

Surface outcrops, seismic data acquisition and its interpretation, subsurface well logging measurements and their interpretation may be used to develop the map of the pre-existing natural fracture network in the subsurface. With the UFM™ model, the simulator predicts the amount of complexity and variation of the hydraulic fracture footprint as it interacts with the pre-existing natural fractures in the reservoir. See, e.g., Gu, H., Weng, X., Lund, J., Mack, M., Ganguly, U. and Suarez-Rivera R. 2011, Hydraulic Fracture Crossing Natural Fracture at Non-Orthogonal Angles, A Criterion, Its Validation and Applications, SPE 139984 presented at the SPE Hydraulic Fracturing Conference and Exhibition, Woodlands, Tex., January 24-26 (2011). Using one or more of these techniques, the hydraulic fracture geometry and the fracture parameters, such as conductivity, pressure in fractures, temperature, may be modeled from the wellsite data collection.

To simulate the propagation of a complex fracture network, equations governing the underlying physics of the fracturing process may be used. The basic governing equations may include, for example: I) fluid flow in the fracture network, II) fracture deformation, and III) the fracture propagation/interaction criterion. In this example, the fluid flow in the fracture network is determined using equations that assume that fluid flow propagates along a fracture network with the following mass conservation:

$$\frac{\partial q}{\partial s} + \frac{\partial (H_{fl} \bar{w})}{\partial t} + q_L = 0 \qquad (1)$$

where q is the local flow rate inside the hydraulic fracture along the length, w is an average width or opening at the cross-section of the fracture at position s=s(x,y), $H_{fl}$ is the height of the fluid in the fracture, and $q_L$ is the leak-off volume rate through the wall of the hydraulic fracture into the matrix per unit height (velocity at which fracturing fluid infiltrates into surrounding permeable medium) which is expressed through Carter's leak-off model. The fracture tips propagate as a sharp front, and the length of the hydraulic fracture at any given time t is defined as l(t).

The properties of driving fluid may be defined by power-law exponent n' (fluid behavior index) and consistency index K'. The fluid flow could be laminar, turbulent or Darcy flow through a proppant pack, and may be described correspondingly by different laws. For the general case of 1D laminar flow of power-law fluid in any given fracture branch, the Poiseuille law (see, e.g., Nolte, 1991) may be used:

$$\frac{\partial p}{\partial s} = -\alpha_0 \frac{1}{\bar{w}^{2n'+1}} \frac{q}{H_{fl}} \left| \frac{q}{H_{fl}} \right|^{n'-1} \qquad (2)$$

where $$\alpha_0 = \frac{2K'}{\phi(n')^{n'}} \cdot \left(\frac{4n'+2}{n'}\right)^{n'}; \phi(n') = \frac{1}{H_{fl}} \int_{H_{fl}} \left(\frac{w(z)}{\bar{w}}\right)^{\frac{2n'+1}{n'}} dz$$

Here w(z) represents fracture width as a function of depth at current position s, α is coefficient, n' is power law exponent (fluid consistency index), φ is shape function, and dz is the integration increment along the height of the fracture in the formula.

Fracture width may be related to fluid pressure through the elasticity equation. The elastic properties of the rock (which may be considered as mostly homogeneous, isotropic, linear elastic material) may be defined by Young's modulus E and Poisson's ratio v. For a vertical fracture in a layered medium with variable minimum horizontal stress $\sigma_h(x, y, z)$ and fluid pressure p, the width profile (w) can be determined from an analytical solution given as:

$$w(x,y,z) = w(p(x,y), H, z) \qquad (4)$$

where w is the fracture width at a point with spatial coordinates x, y, z (coordinates of the center of fracture element), and p(x,y) is the fluid pressure, H is the fracture element height, and z is the vertical coordinate along fracture element at point (x,y).

Because the height of the fractures may vary, the set of governing equations may also include the height growth calculation as described, for example, in Kresse, O., Cohen, C., Weng, X, Wu, R., and Gu, H. 2011, *Numerical Modeling of Hydraulic Fracturing in Naturally Fractured Formations*. 45*th US Rock Mechanics/Geomechanics Symposium, San Francisco, Calif., June 26-29*, the entire contents of which are hereby incorporated herein.

In addition to equations described above, the global volume balance condition may be satisfied:

$$\int_0^t Q(t)dt = \int_0^{L(t)} H(s,t) \bar{w}(s,t) ds + \int_{H_L} \int_0^t \int_0^{L(t)} 2g_L ds dt dh_l \qquad (5)$$

where $g_L$ is fluid leakoff velocity, Q(t) is time dependent injection rate, H(s,t) is the height of the fracture at spacial point s(x,y) and at the time t, ds is length increment for integration along fracture length, $d_t$ is time increment, $dh_l$ is increment of leakoff height, $H_L$ is leakoff height, and so is a spurt loss coefficient. Equation (5) provides that the total volume of fluid pumped during time t is equal to the volume of fluid in the fracture network and the volume leaked from the fracture up to time t. Here L(t) represents the total length of the hydraulic fracture network (HFN) at the time t and $S_0$ is the spurt loss coefficient. The boundary conditions may use the flow rate, net pressure and fracture width to be zero at all fracture tips.

The system of Equations 1-5, together with initial and boundary conditions, may be used to represent a set of governing equations. Combining these equations and discretizing the fracture network into small elements may lead to a nonlinear system of equations in terms of fluid pressure p in each element, simplified as f(p)=0, which may be solved by using a damped Newton-Raphson method.

The generating 662.1 may involve modeling the smooth fracture behavior to solve the governing equations and determine the smooth fracture parameters. UFMs have been developed to understand subsurface fracture networks. Existing models may be used to simulate the governing equations for cases involving smooth fractures. These models may be used, for example, to simulate complex fracture network propagation in a formation with pre-existing natural fractures. The following patents/applications disclose aspects of this modeling, among other things, and each of the following are incorporated by reference herein in their entireties: U.S. Pat. No. 8,412,500; 2014/0305638, Ser. Nos. 14/350,533; 14/664,362; U.S. Pat. No. 7,784,544; Ser. Nos. 12/462,244; 13/517,007; 14/004,612; 14/126,201; 14/356,369; 13/968,648; 14/423,235; and PCT Application Nos. PCT/US2014/064205; PCT/US2013/076765; and PCT/US2014/045182.

The modeling may be performed using existing modeling software, such as UFM™. Conventional planar fracture models, such as UFM™, may model various aspects of the fracture network, such as application of the governing equations to the smooth fracture. Constrained models may be provided to give a fundamental understanding of involved mechanisms, but may be complex in mathematical description and/or require computer processing resources and time in order to provide accurate simulations of hydraulic fracture propagation. The models may consider various factors and/or data, and may be used for fracturing treatment design during well planning and job execution and in post job evaluation.

Example Fracture Simulation

FIG. 7 is a simulation 700 depicting a complex model prediction generated using a fracture simulator, such as UFM™. The simulation 700 includes fractures 774.1, 774.2 positioned about a wellbore 704 and propagating in multiple stages and perforation clusters. The fractures include hydraulic fractures 774.1 and natural fractures 774.2 of a discrete fracture network (DFN).

The simulation 700 is generated by inputting wellsite data into the fracture simulator to generate fracture parameters. The input wellsite data includes a pumping schedule for one stage as input for the simulator as shown in TABLE I below:

TABLE I

| Pump rate (bbl/min)/ (kL/min) | Fluid name | Fluid volume (gal)/(kL) | Proppant | Proppant concentration (PPA) |
|---|---|---|---|---|
| 90/(14.3) | Fracturing fluid | 20000 (75.7) | None | 0 |
| 90/(14.3) | Fracturing fluid | 15000 (56.8) | Proppant type 1 | 0.5 |
| 90/(14.3) | Fracturing fluid | 15000 (56.8) | Proppant type 1 | 1 |
| 90/(14.3) | Fracturing fluid | 15000 (56.8) | Proppant type 2 | 1.5 |
| 90/(14.3) | Fracturing fluid | 15000 (56.8) | Proppant type 3 | 2 |
| 90/(14.3) | Fracturing fluid | 15000 (56.8) | Proppant type 4 | 2.5 |
| 90/(14.3) | Fracturing fluid | 10000 (37.9) | Proppant type 5 | 3 |
| 90/(14.3) | Fracturing fluid | 10000 (37.9) | Proppant type 6 | 3.5 |
| 90/(14.3) | Fracturing fluid | 5000 (18.9) | Proppant type 7 | 4 |

The wellsite data also includes the following input parameters as shown in TABLE II below:

TABLE II

| | |
|---|---|
| Avg. Young's Modulus | 5.0 Mpsi (34,000 MPa) |
| Avg. Poisson's ratio | 0.25 |
| Avg. In Situ Stress | 5800 Psi (40,000 kPa) |
| Fluid Type | Slickwater |
| Fluid Viscosity | 10 cp |
| Proppant type | 100 mesh and 40/70 mesh sand |

The fracture simulation provided by the fracture simulator (e.g., 554.1 of FIG. 5.1), predicts fracture parameters, such as fracture geometry (e.g., extension, height, width, surface area and volume of the fracture) and conductivity of the fracture and fracturing fluid efficiency. Table III below shows parameters generated by the fracture simulator:

TABLE III

| All fracture networks: | | | |
|---|---|---|---|
| EOJ total fracture volume | 14442 ft$^3$ (409 m$^3$) | EOJ leak-off volume | 2799 ft$^3$ (79 m$^3$) |
| Total fracture surface area | 1192081.55 ft$^2$ (110748 m$^2$) | Total propped fracture surface area | 654500.67 ft$^2$ (6076 m$^2$) |
| Total fracture surface area by pay | 0.00 ft$^2$ (0.0 m$^2$) | Total propped fracture surface area by pay | 0.00 ft$^2$ (0.0 m$^2$) |
| Maximum surface pressure | 8055 psi (55.5 MPa) | Maximum BH pressure | 6762 psi (46.6 MPa) |
| Estimated closure time | 4916.35 min | Efficiency | 83.77% |
| Current Fracture Network (Index 1): Hydraulic Fracture Geometry: | | | |
| Final extension of HFN in the direction of max | 1038.09 ftUS (316 m) | EOJ fracture width at wellbore | 0.61 in (1.55 cm) |
| Final extension of HFN in the direction of min | 196.51 ftUS (59.9 m) | EOJ average fracture width | 0.16 in (0.41 cm) |
| Max frac height | 281.02 ft (85.7 m) | EOJ total fracture volume | 3992 ft$^3$ (113 m$^3$) |
| Avg. Frac height | 99.28 ft (30.3 m) | EOJ total leak-off volume | 719 ft$^3$ (20.4 m$^3$) |
| Total fracture surface area | 299766.29 ft$^2$ (27850 m$^2$) | | |
| Total fracture surface area by pay | 0.00 ft$^2$ (0.0 m$^2$) | | |
| Propped Fracture Geometry: | | | |
| Final extension of HFN in the direction of max | 995.78 ftUS (303.5 m) | Avg propped frac height | 99.10 ft (30.2 m) |
| Final extension of HFN in the direction of min | 187.99 ftUS (57.3 m) | Fracture width at wellbore | 0.21 in (0.53 cm) |
| Total propped fracture surface area | 195087.26 ft$^2$ (18124 m$^2$) | Average fracture width | 0.03 in (0.08 cm) |

TABLE III-continued

| Total propped fracture surface area by pay | 0.00 ft² (0.0 m²) |
| --- | --- |
| Pressure/Conductivity: | |
| EOJ net pressure at wellbore | 490 psi (3378 kPa) |
| Average fracture conductivity | 421.45 mD/ft |

II. Reservoir Parameters

The method continues with 662.2 determining reservoir parameters. The reservoir parameters (e.g., pressure, flow rate, permeability, viscosity etc.) may be determined based on the wellsite data 660 and the determined fracture parameters 662.1. The reservoir parameters 662.2 may be generated using reservoir simulation (e.g., ECLIPSE™ OR INTERSECT™). Reservoir simulation may be performed using gridding techniques, such as those described in U.S. Pat. No. 7,716,029, the entire contents of which is hereby incorporated by reference herein.

At the wellsite, measured wellsite data, such as borehole imaging logs, evaluating seismic measurements, ant tracking, sonic measurements, geological measurements, etc., may be used to determine the fracture parameters, such as natural fracture density, spacing and azimuth. Upon running the complex fracture model simulation, the fracture modeling is complete. In order to obtain the dynamic nature of the earth, a reservoir simulation may be performed using numerical analysis. From the reservoir simulation, production parameters (e.g., gas rate, oil rate, water rate, and wellhead pressures) as the well produces post stimulation can be determined.

The reservoir simulator (e.g. ECLIPSE™ or INTERSECT™) uses outputs (e.g., hydraulic fracture properties, hydraulic fracture geometry, etc.) from the fracture simulator 554.1 and reservoir inputs 554.2 to generate the reservoir parameters. The reservoir simulator may generate reservoir parameters (e.g., permeability of the reservoir rock, porosity of the reservoir, saturations of fluid present in the reservoir, reservoir compressibility, etc.) from the fracture parameters and the wellsite data (e.g., production that is governed by the choke size at the wellhead).

Example Reservoir Simulation

Production prediction may be performed from the complex hydraulic fracture network as shown in FIG. 7. FIG. 7 represents the extent of the hydraulic fracture and the geometry in from of complex network. The results of the simulation model through the UFM reports the hydraulic fracture conductivity, which are input into the reservoir simulator 554.2 and the following reservoir properties of Table IV into reservoir simulator 554.2 of FIG. 5.2:

TABLE IV

| Porosity | 6.70% |
| --- | --- |
| Permeability | 0.0001 mD |
| Oil Saturation | 80% |
| Gas Saturation | 0% |
| Water Saturation | 20% |
| Reservoir Compressibility | 1.26 × E − 5 psi⁻¹ (1.84 × E − 7kPa⁻¹) |
| Well head pressure | 500 psia (3447 kPa) |

Figure 8:
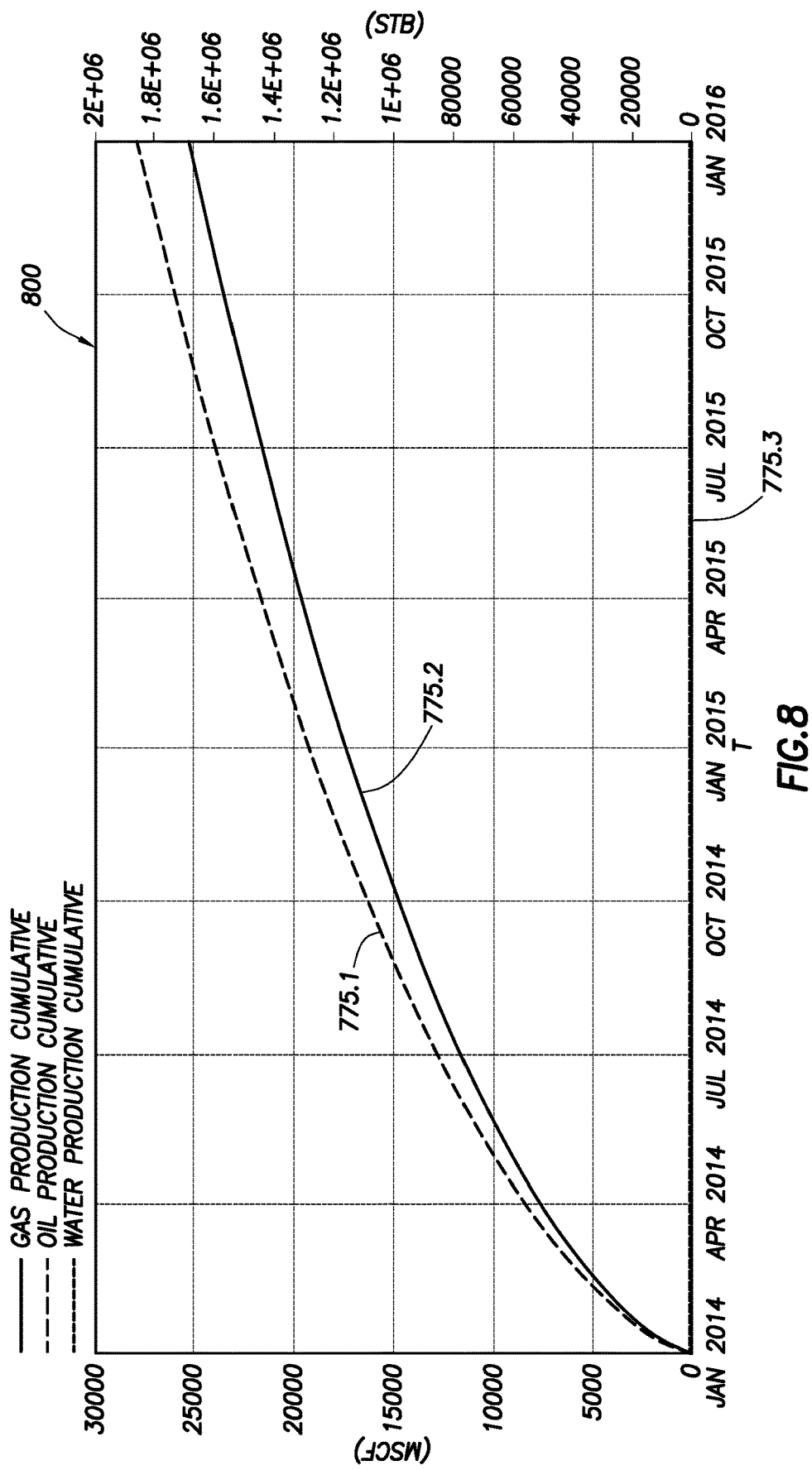
FIG. 8 is a graph of a production prediction for a wellsite.
Figure 9:
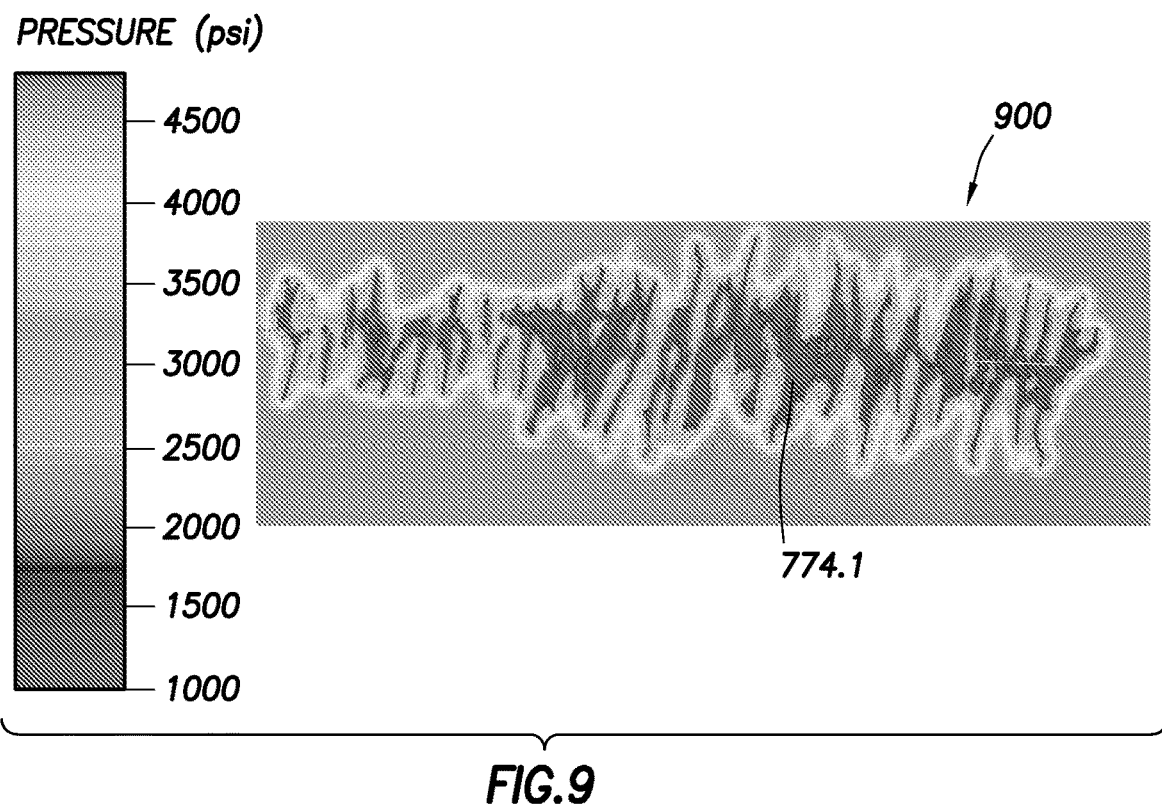
FIG. 9 is a plot depicting a modeled pressure profile for a fracture network.

The reservoir simulator 554.2 generates outputs as shown in FIGS. 8 and 9. FIGS. 8 and 9 are plots 800, 900 depicting the results of the reservoir simulation. The graph 800 shows gas production simulations [MSCF] (y1-axis) and liquid production volume [STB] (y2-axis) versus time T (date) (x-axis). FIG. 8 provides the cumulative gas production 775.1, oil production 775.2, and water production 775.3 based on the reservoir simulation. The production of oil, gas and water may be determined for the well after hydraulic fracturing.

The plot 900 is a pressure depletion profile around the hydraulic fractures 774.1 as the well produces. The gradations around the hydraulic fractures 774.1 represent pressure that depicts the extent of depletion around the fractures and the virgin reservoir.

III. Geomechanical Parameters

The generated fracture parameters 662.1, reservoir parameters 662.2, and production parameters 662.3 may be combined by forming a finite element grid 663.1. The finite element grid may be formed from the fracture and reservoir parameters. The fracture and reservoir parameters may be combined by coupling the hydraulic fracture network to the reservoir grid, and/or by applying the hydraulic fracture network to the reservoir grid and adapting the reservoir grid about the hydraulic fracture network 663.1 as shown by stages I-III of FIG. 5.5. As shown in FIGS. 5.1-5.2, inputs to the finite element simulator 560 may be in the form of a hydraulic fracture network (HFN) 558.1 generated by the fracture simulator 554.1 during the simulation of the hydraulic stimulation. This fracture geometry can be more or less complex depending on the discrete fracture network 559.

Apart from the geometry of the hydraulic fracture network 558.1, the pressures in the subsurface hydraulic fractures that were determined by fracture simulation during the treatment also serves as an input. The geomechanical simulator subsequently computes the corresponding changes in stresses due to hydraulic fracturing. Based on the stress changes and reactivation events of natural fractures, a microseismic response may be calculated.

To combine the fracture parameters of the fracture simulator 554.1 with the reservoir parameters of the fracture simulator 554.2, these parameters may be coupled and integrated for simulation with the discrete fracture network in the finite element simulator 560. As shown in FIG. 5.3, the hydraulic fracture network 558.1 from the fracture simulator and the control-volume flow grid 558.2 from the reservoir simulator are combined by adapting the control volume grids around the simulated fracture 558.1 to alter the structure of the grid for finite element modeling using the gridding described in FIGS. 5.4-5.6. The coupled fracture and reservoir simulations may be solved with compatible discretizations to generate a finite grid element 561 compatible for input into the geomechanical simulator (e.g., VISAGE™).

The formed finite element grid 663.1 may be adjusted based on production rate over time to define a time based finite element grid 663.2 as shown in Stages III-V of FIG. 5.5. Using the formed time based finite element grid 663.2, the geomechanical parameters may be generated 664 from the fracture and reservoir parameters generated during 662.1 and 662.2. The geomechanical parameters may include estimated microseismic measurements determined using geomechanical simulation (e.g., VISAGE™). The geomechanical parameters may be generated using a finite element solution 560 to generate the outputs 562 as shown in FIGS. 5.1 and 5.2.

Stimulation candidate well(s), completion designs, the type of fluid and proppant, and the pumping schedule to perform a treatment are the wellsite parameters that feed into the hydraulic fracture simulation model. The results of the hydraulic fracture simulation and the reservoir simulation are gathered into a geomechanical simulation that is solved by a finite element geomechanical simulator (VISAGE™). Examples of geomechanical simulators that may be used are provided in US Patent No. 20100088076, the entire contents of which is hereby incorporated by reference herein.

Figure 10:
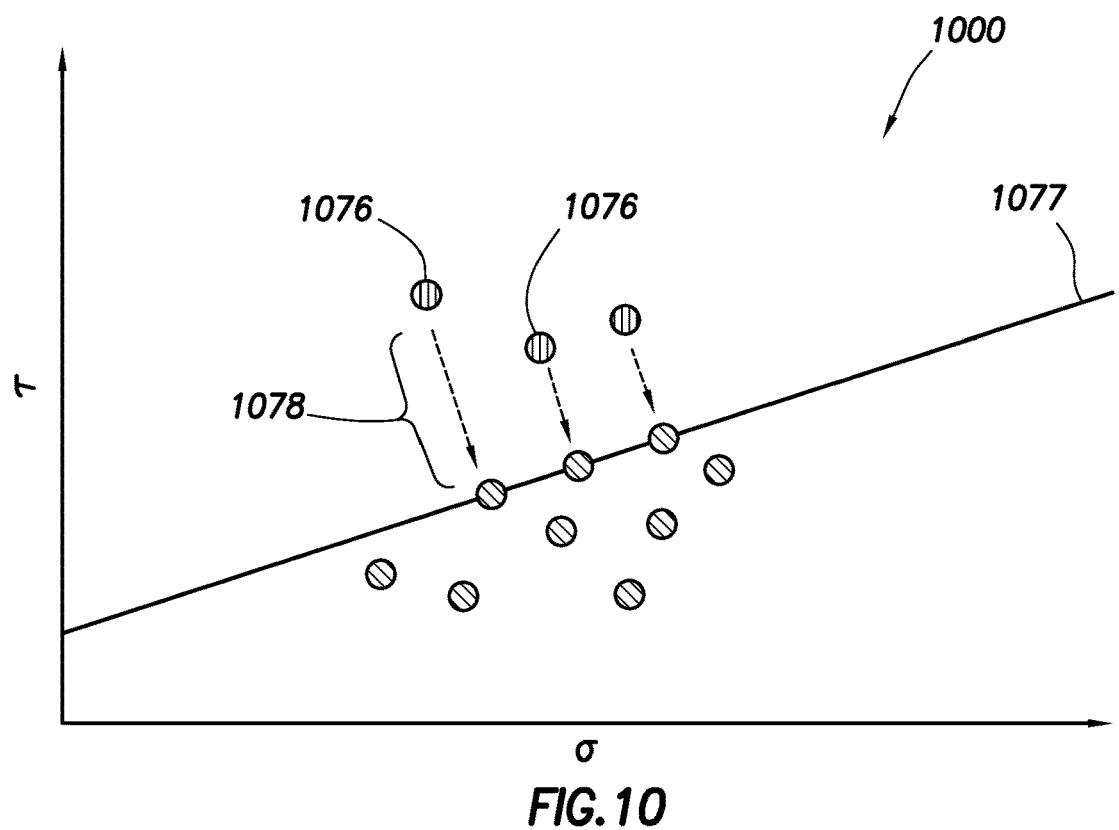
FIG. 10 is a graph depicting predicted microseismic events for a fracture network.

The generating integrated geomechanical parameters may involve generating microseismic events. Microseismic events may occur at locations in the hydraulic and natural fracture network, wherever the stress state on the fractures becomes unstable (FIG. 3.2). Unstable stress states on fractures may result in slippage and a release of energy that manifests in a microseismic event. FIG. 10 is a graph 1000 depicting the microseismic events 1076 predicted from the geomechanical simulation. This graph 1000 plots shear stress τ (y-axis) versus normal stress σ (x-axis). As shown in this graph, a stability line 1077 may define stability of the microseismic events. Above this stability line 1077 and at a certain shear stress and normal stress, the microseismic events 1076 will become unstable and be subject to a stress drop 1078 as indicated.

The microseismic events 1076 may be generated using a finite element simulator (e.g., VISAGE™) by calculating a stress drop to the failure surface. Geomechanical parameters that are computed are listed in the Table V below:

TABLE V

| Primary results: | Advanced Results |
|---|---|
| Overburden stress | ROCKDISX |
| MinHorizontalStress | ROCKDISY |
| MaxHorizontalStress | ROCKDISZ |
| Max stress angle | EFFSTRXX |
| Reservoir Pressure | EFFSTRYY |

Figure 11:
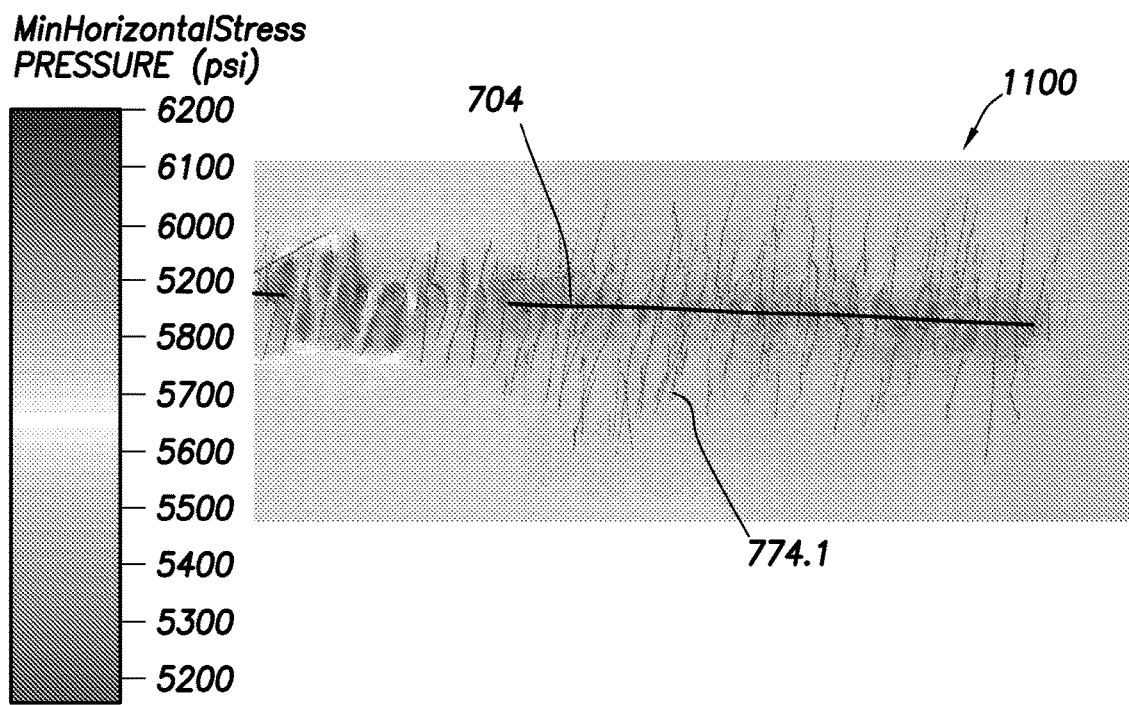
FIG. 11 is a plot depicting modeled stresses for a fracture network.
Figure 12:
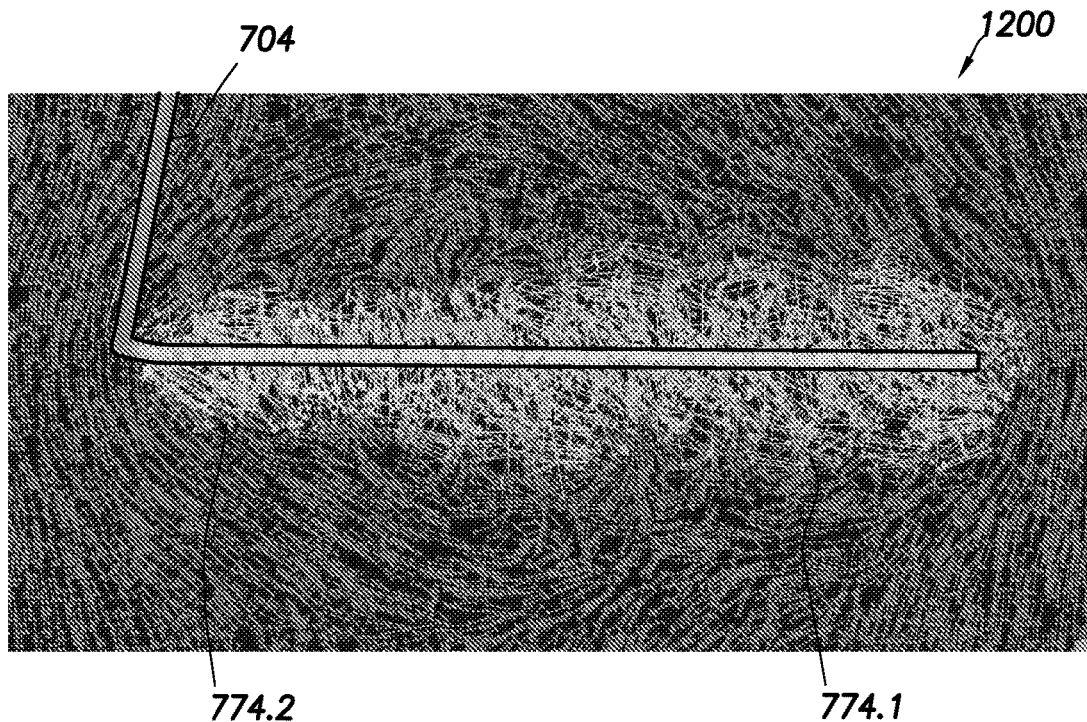
FIG. 12 is a plot depicting a change of stress angle for a fracture network.

FIGS. 11 and 12 depict example outputs that may be provided by the geomechanical simulator. FIG. 11 is a plot 1100 of predicted stresses extending about the hydraulic fractures 774.1 along wellbore 704 that were computed using the finite element geomechanical simulator. The plot 1100 shows stresses resulting from pressure along the fracture. The plot also shows increases in the reservoir's minimum horizontal stress (darker color) as the hydraulic fracturing takes place.

FIG. 12 is a plot 1200 of change in the maximum stress angle about the fractures 774.1 along wellbore 704. These maximum stress angles show an increase in angle along the hydraulic fractures 774.1 due to hydraulic fracturing shown through the means of the arrows. As shown by the darker colored arrows, the angle of the arrows of the natural fractures 774.2 is less.

Figure 13:
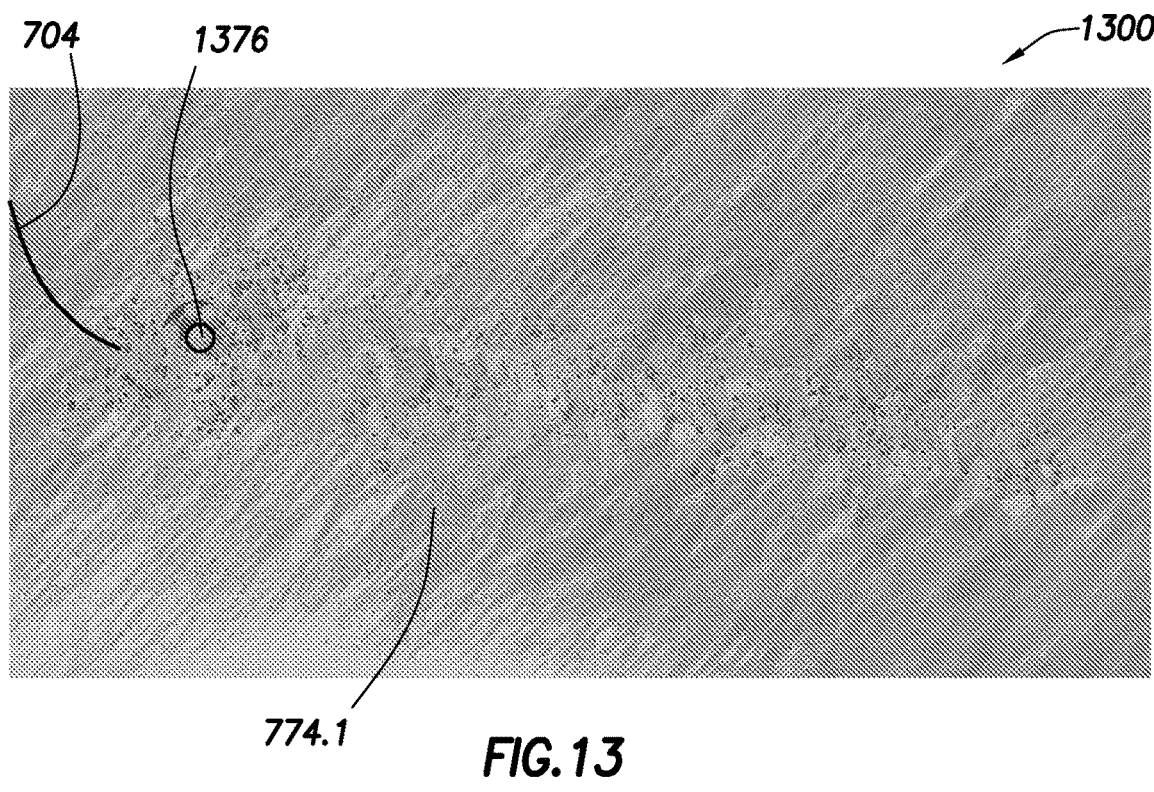
FIG. 13 is a plot depicting predicted microseismic events for a fracture network.
Figure 14:
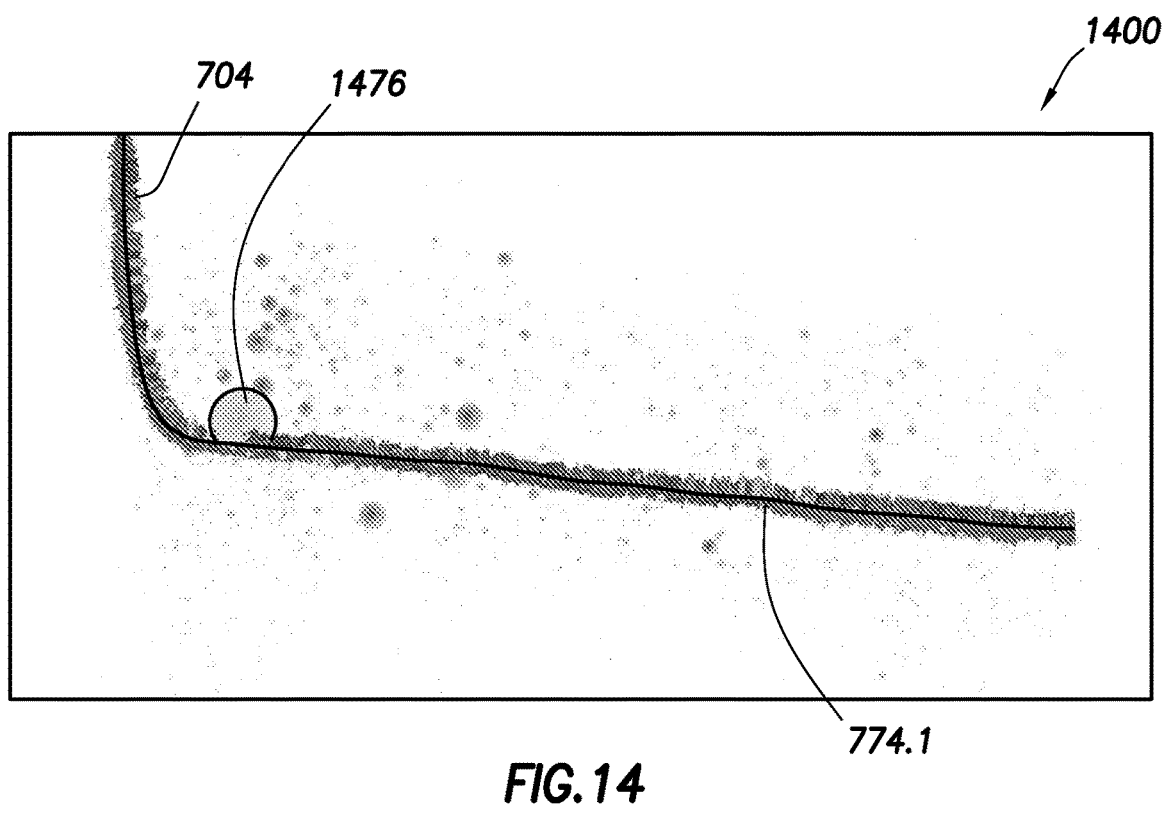
FIG. 14 is a plot depicting predicted spatial features of the predicted microseismic events of the fracture network.

FIGS. 13 and 14 show additional outputs provided by the geomechanical simulator. These figures show plots 1300, 1400 depicting the predicted microseismic events 1376, 1476 applied to fracture simulations. FIG. 13 is a plot 1300 of the hydraulic fractures 774.1 interacting with the surrounding natural fractures 774.2, which creates shear failure of planes and hence generates microseismsic events 1376. These microseismic events 1376 can be predicted through simulation models and measured on the wellsite for verification. FIG. 14 is a plot 1400 of spatial distribution of the predicted microseismic events 1476 plotted along the wellbore 704 and the associated hydraulic fractures 774.1. These and other outputs may be provided as shown, for example, in FIGS. 5.1 and 5.2.

IV. Applications

The method 600 may also involve additional applications, such as validating 665, updating 668, generating integrated wellsite parameters 670, and performing fracture and/or production operations 672. The 665 validating the determined geomechanical parameters may be performed by comparing outputs from the geomechanical simulator (e.g., microseismic events, formation stresses, and reactive fracture displacement) with the measured/observed wellsite data (e.g., measured microseismic events). Examples of calibrating techniques (which may be used for the validating) are provided in US Patent Application No. 2014/0372089, the entire contents of which are hereby incorporated by reference herein.

Figure 15:
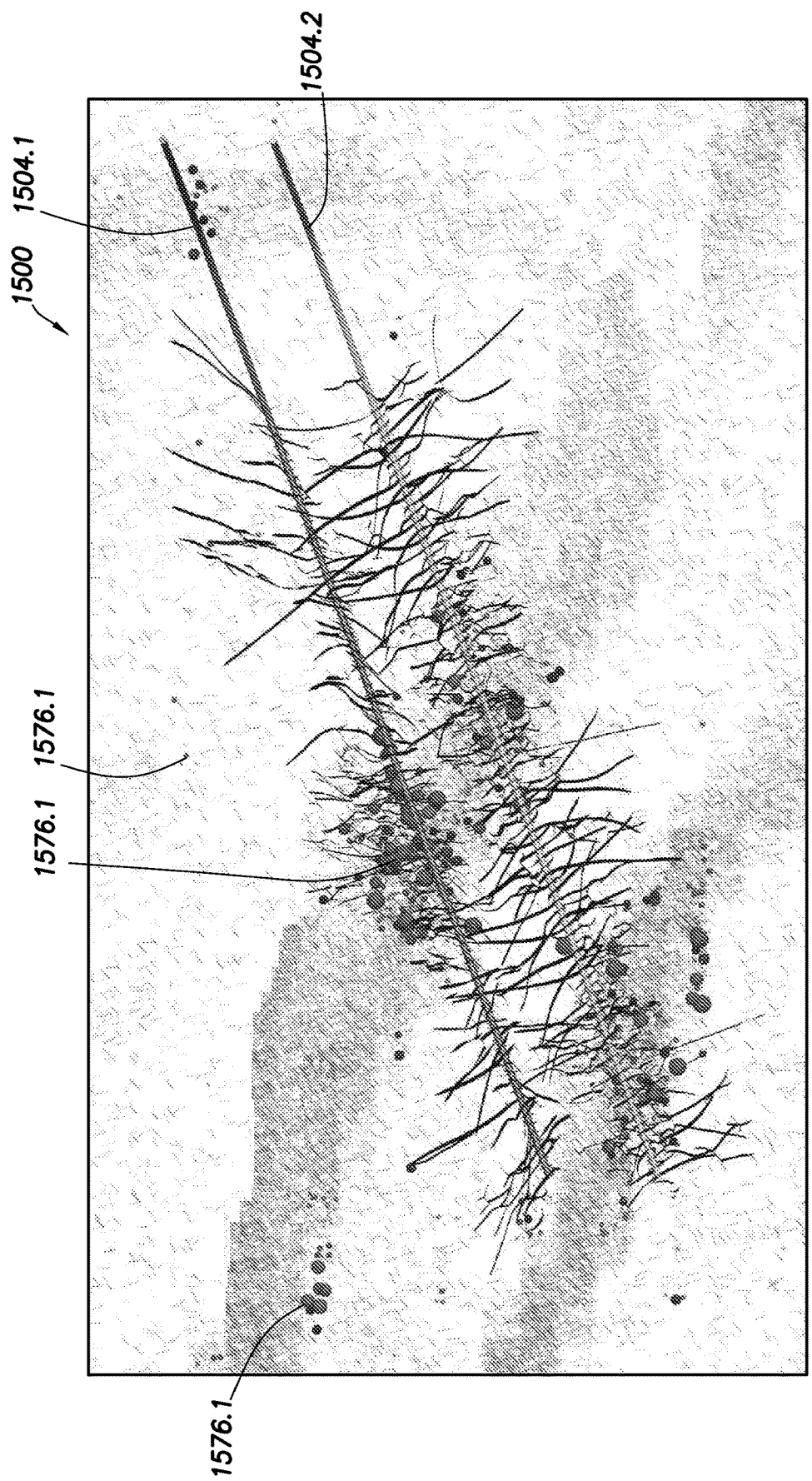
FIG. 15 is a plot depicting calibration of the microseismic predictions for the fracture network.

FIG. 15 is a plot of microseismic event predictions 1576.1 about the modeled fractures 774.1 for a pair of adjacent wellbores 1504.1, 1504.2. The estimated microseismic events 1576.1 are shown as solid circles with darker shading indicating greater stress. Measured microseismic events 1576.2 are also shown. The microseismic events 1576 may be computed from stress drop that occurs during reactivation of the natural fractures. The predicted microseismic events can also be used for calibration to field observations.

Validating may involve, for example, comparing measurements, such as microseismic monitoring of indirect measurement of fracture length and height, Fiber optic based distributed temperature sensing and distributed acoustic sensing for near well measurement of flow distribution in the perforated intervals, radioactive tracer logging for near well measurement of the proppant placement, and temperature and acoustic logging for near well measurement of the fracture height, with the generated fracture parameters. The geomechanical parameters may be validated based on, for example, the measured fracture geometry and production history may be used in the subsequent fracture treatments in neighboring wells to achieve improved fracture design and production performance. Once validated 665, the geomechanical parameters may be fed back into the simulators 661.1-661.3 to determine the grid over time as shown in FIG. 5.5 (Stages IV and V).

If the comparing is outside a maximum range (ΔMax) (e.g., > about 75%), the process may be repeated by assigning different wellsite parameters and/or MEM for use in the determining of the fracture and/or reservoir parameters. If the comparing is within a maximum range, the method continues to 668. The MEM may be updated by recalculating the MEM using the validated geomechanical parameters. For example, the same simulations used to build the MEM may be performed using the validated geomechanical parameters in place of those original used. The integrated wellsite parameters may then be determined from the updated MEM and the validated geomechanical parameters. The integrated wellsite parameters may include, for example, production forecasts of production parameters (e.g., pressure, flow rate, permeability, etc.) using the validated geomechanical parameters as inputs to a reservoir simulator (e.g., INTERSECT™ and/or ECLIPSE™).

The method continues with 670 generating integrated wellsite parameters and 672 performing fracture and/or production operations based on the integrated wellsite parameters. The integrated wellsite parameters may be generated by performing production simulations (e.g., prediction rate of production from the wellsite) using the validated geomechanical parameters. Production operations may be performed, for example, based on the validated fracture geometry. With the knowledge of the geomechanical parameters, such as microseismic locations, the fractures may be predicted and used to define operational decisions accounting for such locations. The fracturing treatment parameters may be optimized to achieve the desired stimulation objectives to maximize well production.

Part or all of the method may be performed in any order and repeated as desired.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although only a few example embodiments have been described in detail above, those skilled in the art will readily appreciate that many modifications are possible in the example embodiments without materially departing from the system and method for performing the integrated oilfield (e.g., fracture and production) operations. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of performing oilfield operations at a wellsite, the wellsite positioned about a subterranean formation having a wellbore therethrough and a fracture network therein, the fracture network comprising natural fractures, the method comprising:
   generating fracture parameters comprising a hydraulic fracture network based on wellsite data comprising a mechanical earth model;
   generating reservoir parameters comprising a reservoir grid based on the wellsite data and the generated fracture parameters;
   generating production parameters comprising production rate over time based on the wellsite data and the hydraulic fracture network;
   forming a finite element grid from the fracture parameters, the production parameters, and the reservoir parameters by coupling the hydraulic fracture network to the reservoir grid;
   generating integrated geomechanical parameters comprising estimated microseismic events based on the finite element grid; and
   performing fracture operations and production operations based on the integrated geomechanical parameters.

2. The method of claim 1, further comprising measuring microseismic events.

3. The method of claim 2, further comprising validating the integrated geomechanical parameters by comparing the estimated microseismic events with the measured microseismic events.

4. The method of claim 3, further comprising repeating the method over time using the validated integrated geomechanical parameters as inputs for the generating.

5. The method of claim 3, further comprising updating the mechanical earth model based on the validating.

6. The method of claim 3, further comprising if a difference between the estimated and measured microseismic events is above a maximum, adjusting the wellsite data input into the fracture parameters and repeating the method.

7. The method of claim 1, further comprising generating production parameters based on the integrated geomechanical parameters and performing fracture operations based on the generated production parameters.

8. The method of claim 1, wherein the generating the fracture parameters comprises generating the hydraulic fracture network by performing fracture simulations based on the wellsite data.

9. The method of claim 8, wherein the generating the reservoir parameters comprises generating the reservoir flow grid by performing reservoir simulations based on the wellsite data.

10. The method of claim 1, wherein the forming comprises applying the hydraulic fracture network to the reservoir flow grid.

11. The method of claim 10, wherein the forming further comprises adapting portions of the reservoir grid positioned about the hydraulic fracture network to the finite element grid.

12. The method of claim 11, wherein the forming comprises generating the finite element grid by applying compatible discretizations to the adapted reservoir grid and the hydraulic fracture network.

13. The method of claim 1, wherein the integrated geomechanical parameters comprise the estimated microseismic events, formation stresses, and reactive fracture displacement.

14. The method of claim 1, wherein the performing fracture and production operations comprises fracturing and producing at the wellsite.

15. The method of claim 1, wherein the forming comprises generating a reservoir grid based on reservoir parameters comprising reservoir pressure and saturation properties and fracture parameters comprising permeability, porosity, and conductivity.

16. A method of performing oilfield operations at a wellsite, the wellsite positioned about a subterranean formation having a wellbore therethrough and a fracture network therein, the fracture network comprising natural fractures, the method comprising:
  collecting wellsite data comprising microseismic events and a mechanical earth model;
  generating fracture parameters comprising a hydraulic fracture network based on the wellsite data;
  generating reservoir parameters comprising a reservoir grid based on the wellsite data and the generated fracture parameters;
  generating production parameters comprising production rate over time based on the wellsite data and the hydraulic fracture network;
  forming a finite element grid from the fracture parameters, the production parameters, and the reservoir parameters by coupling the hydraulic fracture network to the reservoir grid;
  generating integrated geomechanical parameters comprising estimated microseismic events based on the finite element grid;
  generating integrated wellsite parameters comprising integrated production parameters based on the integrated geomechanical parameters; and
  performing fracture operations and production operations based on the integrated wellsite parameters.

17. The method of claim 16, wherein the integrated geomechanical parameters comprise stress.

18. The method of claim 16, wherein the integrated production parameters comprise pressure and flow rate.

19. The method of claim 16, further comprising validating the integrated geomechanical parameters by comparing the estimated microseismic events with measured microseismic events and wherein the performing comprises performing the fracture operations and the production operations based on the validated integrated geomechanical parameters.

20. A method of performing oilfield operations at a wellsite, the wellsite positioned about a subterranean formation having a wellbore therethrough and a fracture network therein, the fracture network comprising natural fractures, the method comprising:
  collecting wellsite data comprising measured microseismic events and a mechanical earth model;
  generating fracture parameters comprising a hydraulic fracture network based on the wellsite data;
  generating reservoir parameters comprising a reservoir grid based on the wellsite data and the generated fracture parameters;
  generating production parameters comprising production rate over time based on the wellsite data and the hydraulic fracture network;
  forming a finite element grid from the fracture parameters, the production parameters, and the reservoir parameters by coupling the hydraulic fracture network to the reservoir grid;
  generating integrated geomechanical parameters comprising estimated microseismic events based on the finite element grid;
  validating the integrated geomechanical parameters by comparing the estimated microseismic events with the measured microseismic events;
  updating the mechanical earth model based on the validated geomechanical parameters;
  generating integrated wellsite parameters comprising integrated production parameters based on the validated, integrated geomechanical parameters; and
  performing fracture operations and production operations based on the integrated wellsite parameters.

21. The method of claim 20, further comprising, if a difference between the estimated and measured microseismic events is above a maximum, adjusting the wellsite data input into the fracture parameters and repeating the method.

* * * * *